US012681578B2

(12) United States Patent
Abe et al.

(10) Patent No.: US 12,681,578 B2
(45) Date of Patent: Jul. 14, 2026

(54) INPUT DEVICE

(71) Applicant: Alps Alpine Co., Ltd., Tokyo (JP)

(72) Inventors: Makoto Abe, Miyagi-ken (JP); Toshiki Nakamura, Miyagi-ken (JP)

(73) Assignee: Alps Alpine Co., Ltd. (JP)

( * ) Notice: Subject to any disclaimer, the term of this patent is extended or adjusted under 35 U.S.C. 154(b) by 837 days.

(21) Appl. No.: 18/156,679

(22) Filed: Jan. 19, 2023

(65) Prior Publication Data

US 2023/0152897 A1 May 18, 2023

Related U.S. Application Data

(63) Continuation of application No. PCT/JP2021/029094, filed on Aug. 5, 2021.

(30) Foreign Application Priority Data

Sep. 8, 2020 (JP) ................................. 2020-150706

(51) Int. Cl.
| | |
|---|---|
| *G06F 3/01* | (2006.01) |
| *B60K 35/10* | (2024.01) |
| *B60K 35/60* | (2024.01) |
| *G06F 3/044* | (2006.01) |
| *G06F 3/04817* | (2022.01) |

(Continued)

(52) U.S. Cl.
CPC .............. *G06F 3/016* (2013.01); *B60K 35/10* (2024.01); *B60K 35/60* (2024.01); *G06F 3/044* (2013.01); *G06F 3/04817* (2013.01); *B60K 35/20* (2024.01); *B60K 35/25* (2024.01);

(Continued)

(58) Field of Classification Search
CPC ...... G06F 3/016; G06F 3/044; G06F 3/04817; B60K 35/10; B60K 35/60; B60K 35/65; B60K 2360/1434; B60K 35/20; B60K 2360/794; B60K 35/25; B60K 2360/119
See application file for complete search history.

(56) References Cited

U.S. PATENT DOCUMENTS

| | | | | |
|---|---|---|---|---|
| 8,577,600 B1 * | 11/2013 | Pierfelice | ............... | G01C 21/34 701/420 |
| 2009/0167704 A1 * | 7/2009 | Terlizzi | ............... | G06F 3/04886 345/173 |

(Continued)

FOREIGN PATENT DOCUMENTS

| | | |
|---|---|---|
| JP | 2001-222271 A | 8/2001 |
| JP | 2011-204136 A | 10/2011 |

(Continued)

OTHER PUBLICATIONS

International Search Report for corresponding International Application No. PCT/JP2021/029094 dated Sep. 21, 2021 (2 Pages).

*Primary Examiner* — David E Choi

(74) *Attorney, Agent, or Firm* — Harness, Dickey & Pierce, P.L.C.

(57) ABSTRACT

An input device has: a panel having a front surface; a manipulation area provided on the front surface so as to be continuous in hierarchical form; a capacitance detection electrode provided in the manipulation area; a plurality of icon display portions provided in the manipulation area, each icon display portion representing one of a plurality of functions; and a tactile response generation portion provided in the manipulation area so as to be along the plurality of icon display portions.

20 Claims, 18 Drawing Sheets

(51) Int. Cl.

| | | |
|---|---|---|
| *B60K 35/20* | (2024.01) | |
| *B60K 35/25* | (2024.01) | |
| *B60K 35/65* | (2024.01) | |

(52) U.S. Cl.

CPC ......... *B60K 35/65* (2024.01); *B60K 2360/119* (2024.01); *B60K 2360/1434* (2024.01); *B60K 2360/794* (2024.01)

(56) References Cited

U.S. PATENT DOCUMENTS

| | | | |
|---|---|---|---|
| 2009/0325645 A1* | 12/2009 | Bang ....................... | G06F 3/016 |
| | | | 345/173 |
| 2018/0074687 A1* | 3/2018 | Ho ......................... | B60K 37/20 |
| 2018/0181122 A1 | 6/2018 | Kadoya et al. | |
| 2018/0341993 A1* | 11/2018 | Bostick .............. | G06Q 30/0282 |
| 2020/0180436 A1* | 6/2020 | Obiagwu ............. | G09G 3/3406 |
| 2023/0152897 A1* | 5/2023 | Abe ........................ | G06F 3/041 |
| | | | 715/702 |

FOREIGN PATENT DOCUMENTS

| | | |
|---|---|---|
| JP | 2018-103834 A | 7/2018 |
| WO | 2019-084082 A1 | 5/2019 |

* cited by examiner

INPUT DEVICE

CLAIM OF PRIORITY

This application is a Continuation of International Application No. PCT/JP2021/029094 filed on Aug. 5, 2021, which claims benefit of Japanese Patent Application No. 2020-150706 filed on Sep. 8, 2020. The entire contents of each application noted above are hereby incorporated by reference.

BACKGROUND OF THE INVENTION

1. Field of the Invention

The present invention relates to an input device.

2. Description of the Related Art

A conventional display device includes: a camera unit that takes a picture of a manipulation panel that displays a screen with item buttons arranged and accepts a manipulation performed by the user on an item button; a display unit that enables the user to visually recognize the manipulation panel and displays information; and a control unit that recognizes the position of the manipulation panel in a display area on the display unit and a current screen, which is a screen currently displayed on the manipulation panel, according to imaging data obtained by imaging at the manipulation panel by the camera unit, and displays item information on the display unit so as not to overlap the manipulation panel, item information indicating the contents of the item buttons arranged on a screen shiftable from the current screen (see Japanese Unexamined Patent. Application Publication No. 2018-181261, for example).

With the conventional display device, the item buttons displayed on a screen shiftable from the current display are not hardware buttons, which are actually present, but are displayed as virtual images. Therefore, the user cannot directly touch the item buttons to manipulate them. This prevents the user from directly specifying and manipulating an item button for a screen to which to shift. From this viewpoint, the conventional display device is not good in maneuverability.

In view of this, the present invention provides an input device that is superior in maneuverability.

SUMMARY OF THE INVENTION

An input device in an embodiment of the present invention has: a panel having a front surface; a manipulation area provided on the front surface so as to be continuous in hierarchical form; a capacitance detection electrode provided in the manipulation area; a plurality of icon display portions provided in the manipulation area, each icon display portion representing one of a plurality of functions; and a tactile response generation portion provided in the manipulation area so as to be along the plurality of icon display portions.

An input device that is superior in maneuverability can be provided.

DESCRIPTION OF THE PREFERRED EMBODIMENTS

An embodiment to which an input device in the present invention is applied will be described below.

Embodiment

Figure 1:
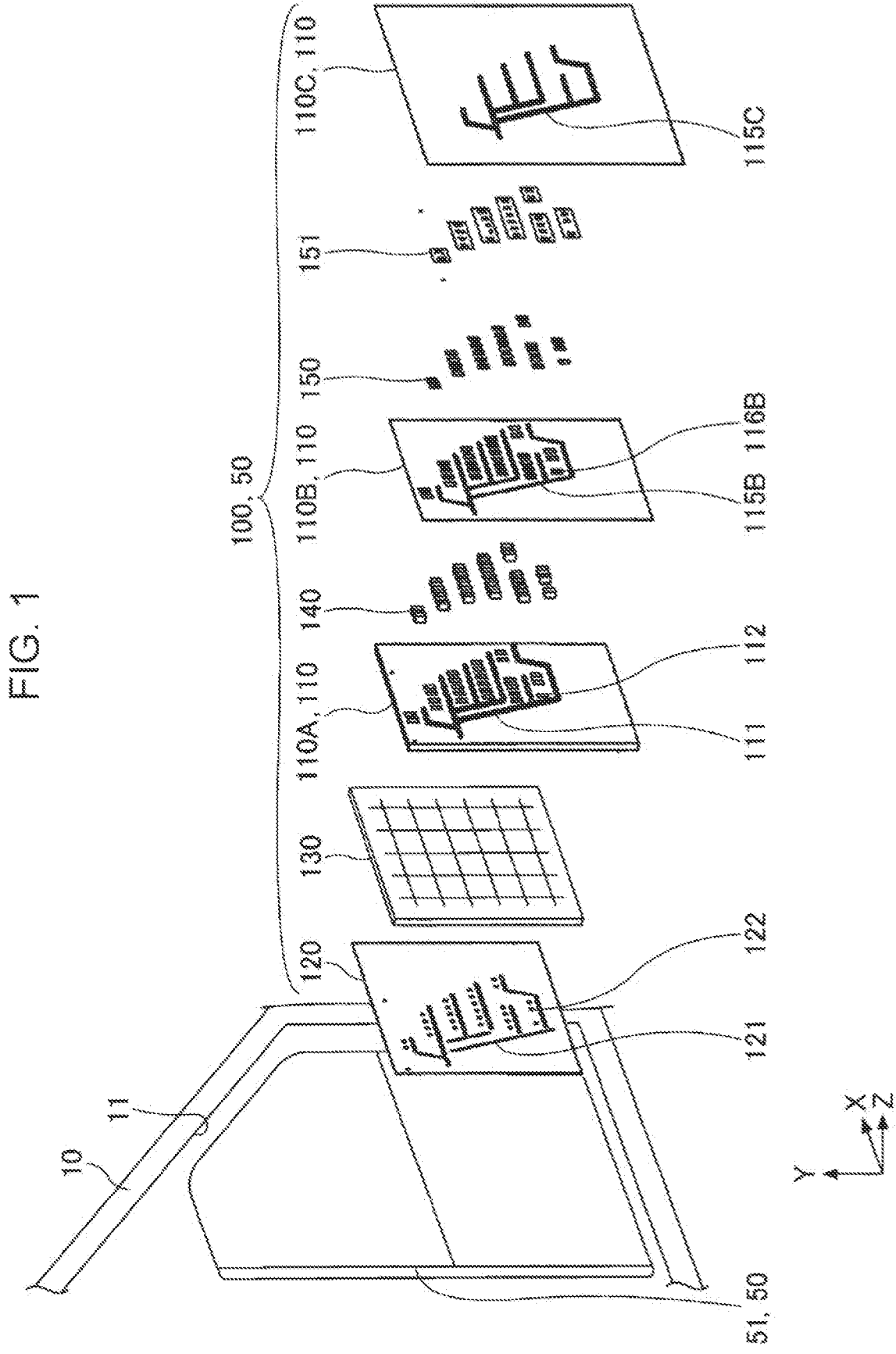
FIG. 1 is an exploded view of a door of a vehicle that includes an input device in an embodiment.

FIG. 1 is an exploded view of a door 50 of a vehicle 10 that includes an input device 100. The description below is based on an XYZ coordinate system. For convenience of explanation, the −Y-direction side will be referred to below as the downward side or "downward", and the +Y-direction side will be referred to below as the upward side or "upward". As an example, the +X direction refers to the forward of the vehicle 10 and the −X direction refers to the backward of the vehicle 10. A plan view refers to an XY plan view.

The vehicle 10 is an automobile that can travel on a road by using, for example, an engine and/or a motor. The vehicle 10 may be equipped with autonomous driving functions at various levels stipulated by, for example, the Society of Automotive Engineers (SAE) International in the United States. FIG. 1 illustrates part of an opening 11 in which the door 50 on the left side of the vehicle 10 is stored. An example of the door 50 is the door on the driver seat side. In the description below, a left-hand drive vehicle will be taken as an example of the vehicle 10. However, the vehicle 10 may be a right-hand drive vehicle or a vehicle with a steering wheel placed at the center. The vehicle 10 may not be an automobile; for example, the vehicle 10 may be, for example, a railroad vehicle or the like.

The door 50 includes a door panel 51 and the input device 100. In FIG. 1, the −Z-direction side with respect to the door panel 51 is the outer side of the vehicle 10, and the +Z-direction side with respect to the door panel 51 is the interior side of the vehicle 10. The input device 100, which is attached to the interior side with respect to the door panel 51, doubles as the inner panel of the door 50. Here, descriptions of a window attached to the door 50, a mechanism that opens and closes the window, and the like will be omitted.

The input device 100 includes a panel 110, a circuit board 120, an electrode seat 130, light guides 140, and gel seats 150. The panel 110 has a board 110A, a cushion 110B, and an outer layer 110C. When a hand touches a surface of the panel 110, the surface being the surface of the outer layer 110C on the +Z-direction side, or a hand is held over the surface of the panel 110, the input device 100 can be manipulated for various functions of the vehicle 10, such as, for example, the locking and unlocking of the door 50 and the turning on/off of an air conditioner and an audio device.

In the description below, it will be assumed as an example that the input device 100 is attached to the door 50. However, the input device 100 may be attached to a portion other than the doors of the vehicle 10. For example, the input device 100 may be attached to a center console, an armrest, or the like. In the description below, it will also be assumed as an example that the input device 100 is mounted in the vehicle 10. However, the input device 100 may be mounted in a moving body other than the vehicle 10, such as, for example, an airplane. Alternatively, the input device 100 may be attached to a stationary object such as, for example, a wall of a building or a fixed device.

The panel 110 doubles as the inner panel of the door 50. The panel 110 is constituted by the board 110A, cushion 110B, and outer layer 110C. The surface of the panel 110 is the surface of the outer layer 110C on the +Z-direction side.

The board 110A is a member used as the base of the panel 110. The board 110A is disposed between the electrode seat 130 and the cushion 110B and has a convex portion 111 and a plurality of openings 112.

The convex portion 111 is designed so as to be like a tree diagram in plan view. The convex portion 111 protrudes in the +Z direction from the surface of the board 110A on the +Z-direction side. The convex portion 111 is formed from a transparent or translucent resin. Portions of the board 110A other than the convex portion 111 are formed from an opaque resin. The convex portion 111 is an example of a first translucent portion. The board 110A having the convex portion 111 of this type can be manufactured by, for example, two-color molding. The reason why the convex portion 111 protrudes in the +Z direction is that the input device 100 in an assembled form has, on the outer layer 110C, a convex portion similar to the convex portion 111. The reason why the convex portion 111 is transparent or translucent is to preferably transmit light emitted from light emitting diodes (LEDs) 121 provided on the circuit board 120, which will be described later. The convex portion 111 also fulfills the role of guiding light emitted from the LEDs 121. The reason why the convex portion 111 is shaped like a tree diagram will be described later with reference to FIG. 2.

The plurality of openings 112, which are formed along the convex portion 111 shaped like a tree diagram, are provided to transmit light emitted from LEDs 122 provided on the circuit board 120. Although the board 110A is illustrated as a plate-like member in FIG. 1, the board 110A may have various concave portions and convex portions to match the design of the inner panel of the door 50 (the shapes of the door handle, the armrest, and the like).

The cushion 110B is disposed between the board 110A and the outer layer 110C. The cushion 110B gives elasticity to the outer layer 110C. An example of the cushion 110B is a member like a thin sheet formed from a sponge material. The cushion 110B has an opening 115B and a plurality of openings 116B.

The opening 115B has the same shape as the convex portion 111 on the board 110A in plan view. The position of the opening 115B matches the position of the convex portion 111. Since the thickness of the cushion 110B in the Z direction is smaller than an amount by which the convex portion 111 on the board 110A protrudes in the Z direction, that is, the height of the convex portion 111 in the Z direction, the convex portion 111 protrudes from the surface of the cushion 110B on the +Z-direction side in the +Z direction in a state in which the input device 100 is assembled. The opening 115B transmits light emitted from the LEDs 121 and allows the convex portion 111 to protrude through the opening 115B toward the +Z-direction side.

Each of the plurality of openings 116B has the same shape as the plurality of openings 112 in the board 110A. The positions of the plurality of openings 116B match the positions of the plurality of openings 112. The plurality of openings 116B transmit light from the plurality of LEDs 122.

The outer layer 110C, which is positioned on the surface of the panel 110, is a sheet-like translucent member having flexibility, with which the 110C can be deformed along the convex portion 111 on the board 110A. As an example, the outer layer 110C is made of an artificial leather having translucency. The outer layer 110C can transmit light emitted from the LEDs 121 and 122. The outer layer 110C forms a convex portion 115C, which is shaped like a tree diagram in plan view, along the convex portion 111 protruding through the opening 115B in the cushion 110B toward the +Z-direction side. The surface of the outer layer 110C on the +Z-direction side is a manipulation surface, on which a manipulation for the input device 100 is performed. The convex portion 115C is an example of a tactile response generation portion that generates a tactile response to, for example, a finger of the user with which the user touches the convex portion 115C. In a manipulation area, which will be described later, including a high-end manipulation area and at least one low-end manipulation areas, a portion other than the convex portion 115C is an example of a portion other than the tactile response generation portion.

The circuit boar 120, which is a printed circuit board (PCB), is disposed on the −Z-direction side of the electrode seat 130. A plurality of LEDs 121 and a plurality of LEDs 122 are preferably mounted on the surface of the circuit board 120 on the +Z-direction side. The plurality of LEDs 121 are placed like a tree diagram in plan view so as to match the convex portion 111 on the board 110A. Each LED 121 is an example of a first light source. The plurality of LEDs 122 are placed along the plurality of LEDs 121 placed like a tree diagram. Each LED 122 is an example of a second light source. Each LED 122 includes two LEDs that emit light in different colors. Here, descriptions of a lighting controller for the LEDs 121 and 122 will be omitted.

The electrode seat 130 is an example of a capacitance detection electrode. The electrode seat 130 is disposed between the circuit board 120 and the board 110A. The electrode seat 130 detects a position at which the user has performed a manipulation on the surface of the outer layer 110C. The electrode seat 130 has a plurality of transparent electrodes formed on one surface of a transparent substrate so as to extend in the X direction, and also has a plurality of transparent electrodes formed on another surface of a transparent substrate so as to extend in the Y direction. The transparent electrode is formed from, for example, an indium tin oxide (ITO) material. The electrode seat 130 is a set of electrodes that detect a change in capacitance between the electrode seat 130 and, for example, a finger of the user who performs a manipulation on the outer layer 110C. An example of the electrode seat 130 is a self-capacitance detection type of sensor.

One light guide 140 is provided for each of the plurality of openings 112 in the board 110A. The light guide 140 is a member that guides, in the +Z direction, light emitted from the relevant LED 122. The light guide 140 is formed from, for example, a transparent resin. Portions, corresponding to the plurality of openings 112, of the light guides 140 may be integrally formed from a light guide sheet.

The gel seat 150 is an example of a second translucent portion. One gel seat 150 is provided in each of the plurality of openings 116B in the cushion 110B. One mask sheet 151 is provided on the surface of each gel seat 150 on the +Z-direction side. The mask sheet 151 is a printout, produced on the surface of the gel seat 150, of an icon representing one of various functions of the vehicle 10. For easy understanding, the gel sheets 150 and mask sheets 151 are separated in FIG. 1. On the mask sheet 151, a portion of the pattern, symbols, numerals, letters, or the like of the icon is transparent without being subject to printing, but a light shielding coating is printed on portions other than the pattern, symbols, numerals, letters, or the like. The transparent portion, on the mask sheet 151, in which the pattern, symbols, numerals, letters, or the like of the icon is formed without a light shielding coating being printed, is a non-printed portion. The gel seat 150 has flexibility equivalent to the flexibility of the cushion 110B. Therefore, the plurality of openings 116B in the cushion 110B can also give, to the outer layer 110C, flexibility equivalent to the flexibility in portions in which the cushion 110B is present. Thus, on the surface of the outer layer 110C, the icons and portions other than the icons are made to be flush and produce similar tactile responses.

With the input device 100 described above, on the surface of the outer layer 110C, only the convex portion 115C shaped like a tree diagram in plan view appears and the icons formed on the gel seats 150 are invisible when the LEDs 121 and 122 are turned off.

When all LEDs 121 are turned on, the convex portion 115C goes on. When all LEDs 122 are turned on, the icons formed on the gel seats 150 go on along the convex portion 115C. When all LEDs 121 and all LEDs 122 are turned on, the convex portion 115C goes on and the icons formed on the gel seats 150 go on along the convex portion 115C. Therefore, when LEDs to be turned on are selected from all LEDs 121 and all LEDs 122, various segments of the convex portion 115C and various icons can be lighted.

Figure 2:
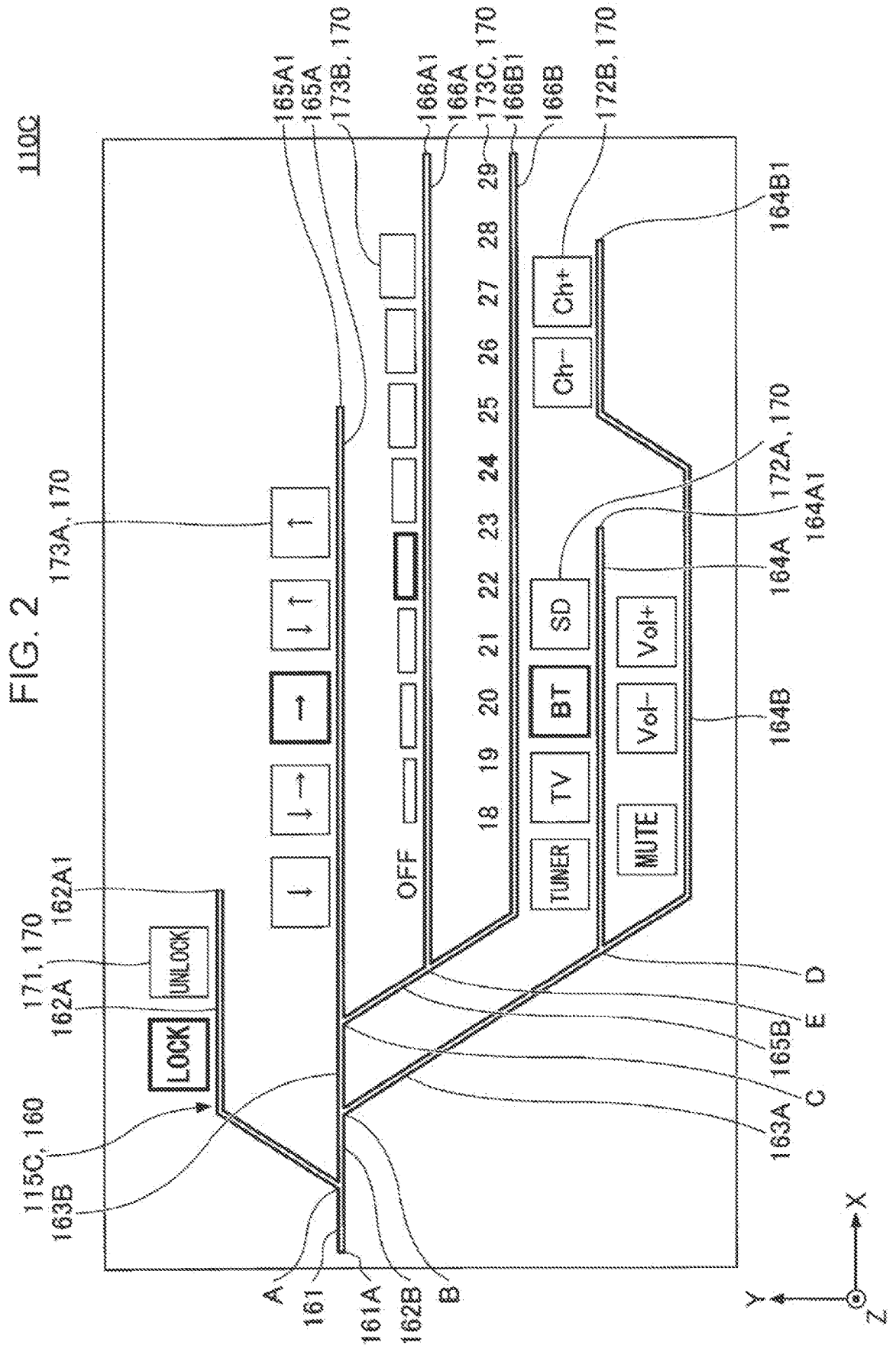
FIG. 2 illustrates icons as well as a tree-like pattern of a convex portion on an outer layer.

FIG. 2 illustrates icons 170 as well as a tree-like pattern 160 formed by the convex portion 115C on the outer layer 110C. The tree-like pattern 160 formed like a tree diagram is a planar pattern formed by the convex portion 115C, which appears on the surface of the outer layer 110C on the +Z-direction side. The convex portion 115C is a portion that protrudes in the +Z direction, the portion being part of the outer layer 110C, as a result of the outer layer 110C being pressed from the –Z-direction side by the convex portion 111 on the board 110A. Therefore, the tree-like pattern 160 is the same as the planar shape of the convex portion 111 on the board 110A.

The icon 170 is displayed on the surface of the outer layer 110C when light emitted from the relevant LED 122 passes through the non-printed portion on the mask sheet 151 on the surface of the gel seat 150 and then passes through the outer layer 110C. A portion in which the icon 170 is displayed, the portion being part of the surface of the outer layer 110C, is an example of an icon display portion. The icon 170 displayed in the icon display portion is not limited to a pattern. Symbols, numerals, letters, and the like can also be used as the icon 170. When the relevant LED 122 is turned off, the icon 170 does not appear on the surface of the outer layer 110C. When the LED 122 is turned on, the icon 170 appears on the surface of the outer layer 110C. For convenience of explanation, FIG. 2 illustrates the icons 170 that appear on the surface of the outer layer 110C when the LEDs 122 are turned on.

The tree-like pattern 160 includes patterns 161, 162A, 162B, 163A, 163B, 164A, 164B, 165A, 165B, 166A, and 166B as well as points A to E. Icons 170 include icons 171, 172A, 172B, 173A, 173B, and 173C. The electrode seat 130 is disposed on the –Z-direction side of the patterns 161, 162A, 162B, 163A, 163B, 164A, 164B, 165A, 165B, 166A and 166B and the icons 171, 172A, 172B,173A, 173B and 173C. Therefore, when the position of a finger or the like is detected according to a change in capacitance detected on the electrode seat 130, it is found that the place of the user's touch is which of the patterns 161, 162A, 162B, 163A, 163B, 164A, 164B, 165A, 165B, 166A and 166B and the icons 171, 172A, 172B, 173A, 173B and 173C.

The patterns 161 to 166B are placed so as to branch in hierarchical form, starting from the –X-direction side. Of these patterns, the pattern 161 present at the extreme end on the –X-direction side is at the highest level of the hierarchy, and the patterns 162 to 166B are at lower hierarchical levels than the pattern 161. There is no hierarchical relation in each of the patterns 161 to 166B.

In each of the patterns 162A to 166B, however, the end closer to the pattern 161 will be referred to as the high end for convenience of explanation.

Of the patterns 161 to 166B, a pattern closer to the pattern 161 with respect to each of the points A to E is a pattern on a high-end side and a pattern more distant from the pattern 161 with respect to each of the points A to E is a pattern on a low-end side. The points A to E are branch points at which the tree-like pattern 160 branches. The patterns 161 to 166B are equivalent to branches of the tree-like pattern 160.

The pattern 161, which is between an end 161A and the point A, is a segment at the highest level of the hierarchy among the patterns 161 to 166B in hierarchical form. At the point A, the patterns 162A and 162B are linked to the pattern 161. In other words, the pattern 161 branches to the patterns 162A and 162B at the point A. When viewed from the point A, an area in which the pattern 161 is present is an example of the high-end manipulation area.

Although no icon 170 is placed in the segment of the pattern 161, an icon at a higher hierarchical level than the hierarchical levels of the icons 171 to 173C may be placed along the pattern 161. An example of an icon at a higher hierarchical level than the hierarchical levels of the icons 171 to 173C is an icon assigned a function that selectively turns on and off the power of the input device 100 itself.

The pattern 162A extends upward at an oblique angle from the point A, bends, and further extends to an end 162A1 in the +X direction. The pattern 162A is a segment at a lower hierarchical level than the hierarchical level of the pattern 161. As an example, two icons 171 are placed along the pattern 162A. When viewed from the point A, an area in which the pattern 162A and two icons 171 are placed is an example of the low-end manipulation area.

The two icons 171 are assigned functions that selectively lock and unlock the door. The two icons 171 are icons related to functions in a common category involved in door locking. Thus, groups eligible for manipulation, the groups being classified into a category or the like, can be collected as a desired pattern and can be placed in the low-end manipulation area.

The patterns 162B is a segment extending between the points A and B. At the point B, the patterns 163A and 163B are linked to the pattern 162B. In other words, the pattern 162B branches to the patterns 163A and 163B at the point B. When viewed from the point B, an area in which the pattern 162B is present is another example of the high-end manipulation area.

The pattern 163A extends downward at an oblique angle from the point B so as to extend between the points B and D. When viewed from the point B, an area in which the pattern 163A is present is another example of the low-end manipulation area. At the point D, the pattern 164A and 164B are linked to the pattern 163A. In other words, the pattern 163A branches to the patterns 164A and 164B at the point D.

The pattern 163B extends from the point B in the +X direction so as to extend between the points B and C. When viewed from the point B, an area in which the pattern 163B is present is another example of the low-end manipulation area. At the point C, the pattern 165A and 165B are linked to the pattern 163B. In other words, the pattern 163B branches to the patterns 165A and 165B at the point C.

The pattern 164A extends from the point D to an end 164A1 in the +X direction. As an example, four icons 172A are placed along the pattern 164A. The pattern 164A is a segment at a lower hierarchical level than the hierarchical level of the pattern 163A. When viewed from the point D, an area in which the pattern 164A and icons 172A are placed is another example of the low-end manipulation area.

As an example, the four icons 172A are assigned functions that select TUNER representing a tuner, TV representing a television set, BT representing Bluetooth (registered trademark), and SD representing a secure digital (SD) card. The four icons 172A are icons related to functions in a common category involved in external inputs.

The pattern 164B extends downward at an oblique angle from the point D and extends to an end 164B1 in the +X direction while repeatedly bending. As an example, five icons 172B are placed along the pattern 164B. The pattern 164B is a segment at a lower hierarchical level than the hierarchical level of the pattern 163A. When viewed from the point D, an area in which the pattern 164B and two icons 172B are placed is another example of the low-end manipulation area.

As an example, the five icons 172B are assigned functions that select MUTE representing a mute, VOL− representing a drop in volume, VOL+ representing an increase in volume, CH− representing a channel manipulation, and CH+ representing a channel manipulation. The five icons 172B are icons related to functions in a common category involved in volume adjustment and channel selection.

The pattern 165A extends from the point C to an end 165A1 in the +X direction. As an example, five icons 173A are placed along the pattern 165A. The pattern 165A is a segment at a lower hierarchical level than the hierarchical level of the pattern 163B. When viewed from the point C, an area in which the pattern 165A and icons 173A are placed is another example of the low-end manipulation area.

As an example, the five icons 173A select the orientations of the outlet of an air conditioner. Specifically, the five icons 173A select ↓ (downward), ↓→ (downward and frontward), → (frontward), ↓→ (downward and upward), and ↑ (upward) from the −X-direction side toward the +X-direction side. The five icons 173A are icons related to functions in a common category involved in the selection of the orientation of the outlet of the air conditioner.

The pattern 165B extends downward at an oblique angle from the point C to the point E so as to extend between the points C and E. When viewed from the point C, an area in which the pattern 165B is present is another example of the low-end manipulation area. At the point E, the patterns 166A and 166B are linked to the pattern 165B. In other words, the pattern 165B branches to the patterns 166A and 166B at the point E.

The pattern 166A extends from the point E to an end 166A1 in the +X direction. As an example, nine icons 173B are placed along the pattern 166A. The pattern 166A is a segment at a lower hierarchical level than the hierarchical level of the pattern 165B. When viewed from the point E, an area in which the pattern 166A and icons 173B are placed is another example of the low-end manipulation area.

As an example, the nine icons 173B adjust the air flow rate of the air conditioner. The nine icons 173B include an icon that selects OFF that stops an air flow and eight icons that adjust the air flow rate at eight levels, from the −X-direction side toward the +X-direction side. The nine icons 173B are icons related to functions in a common category involved in the setting of the amount of air from the air conditioner.

The pattern 166B extends from the point E to an end 166B1 in the +X direction. As an example, twelve icons 173C are placed along the pattern 166B. The pattern 166B is a segment at a lower hierarchical level than the hierarchical level of the pattern 165B. When viewed from the point E, an area in which the pattern 166B and icons 173C are placed is another example of the low-end manipulation area.

The twelve icons 173C are assigned functions that select a temperature setting for the air conditioner. Specifically, the twelve icons 173C set a temperature setting within the range of 18 degrees indicated by 18 to 29 degrees indicated by 29. The twelve icons 173C are icons related to functions in a common category involved in the selection of a temperature setting for the air conditioner.

Which portion of the manipulation area is the high-end manipulation area or low-end manipulation area differs depending on, as an example, which of the points A to E is the reference of the high-end side and low-end side, as described above. An icon included in the high-end manipulation area with respect to any one of the points A to E is at a higher hierarchical level than an icon included in the low-end manipulation area located on the low-end side of the high-end manipulation area. An icon included in the low-end manipulation area is at a lower hierarchical level. An icon at a higher hierarchical level (higher end) is assigned, for example, a function with a higher-level concept when compared with a function assigned to an icon at a lower hierarchical level.

Next, how a display on the input device 100 shifts will be described with reference to FIGS. 3 to 13. FIGS. 3 to 13 illustrate displays on the input device 100. The displays in FIGS. 3 to 13 appear on the outer layer 110C. In FIGS. 4 to 12, the position of a finger F in contact with the outer layer 110C is indicated by a circle denoted F.

Figure 3:
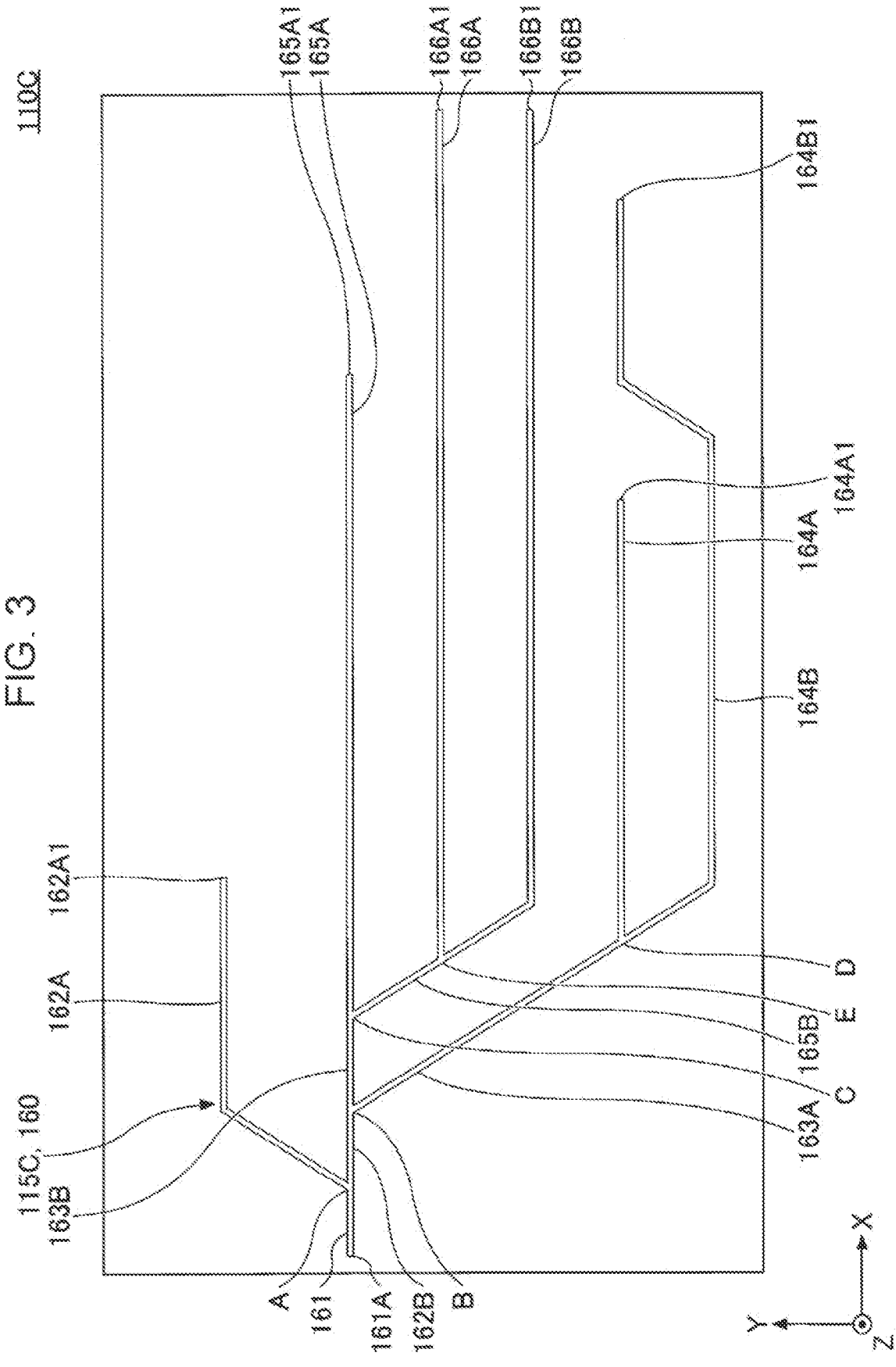
FIG. 3 illustrates a display on the input device.

FIG. 3 illustrates an initial state in which all LEDs 121 and 122 are turned off and only the convex portion 115C is thereby visible. Since, in the initial state, all LEDs 121 and 122 are turned off, there is nothing that indicates the presence of the input device 100 except that the convex portion 115C is provided on the surface of the outer layer 110C. That is, the initial state is similar to the state of the inner panel of a door that lacks the input device 100, except that the convex portion 115C is present. In a state in which the input device 100 is not manipulated, therefore, it is possible to provide an appearance similar to the appearance of a door that lacks the input device 100. In other words, in the initial state, it is possible to provide an appearance in which a special scene with the input device 100 provided is excluded as much as possible and the convex portion 115C is used as part of the design.

Figure 4:
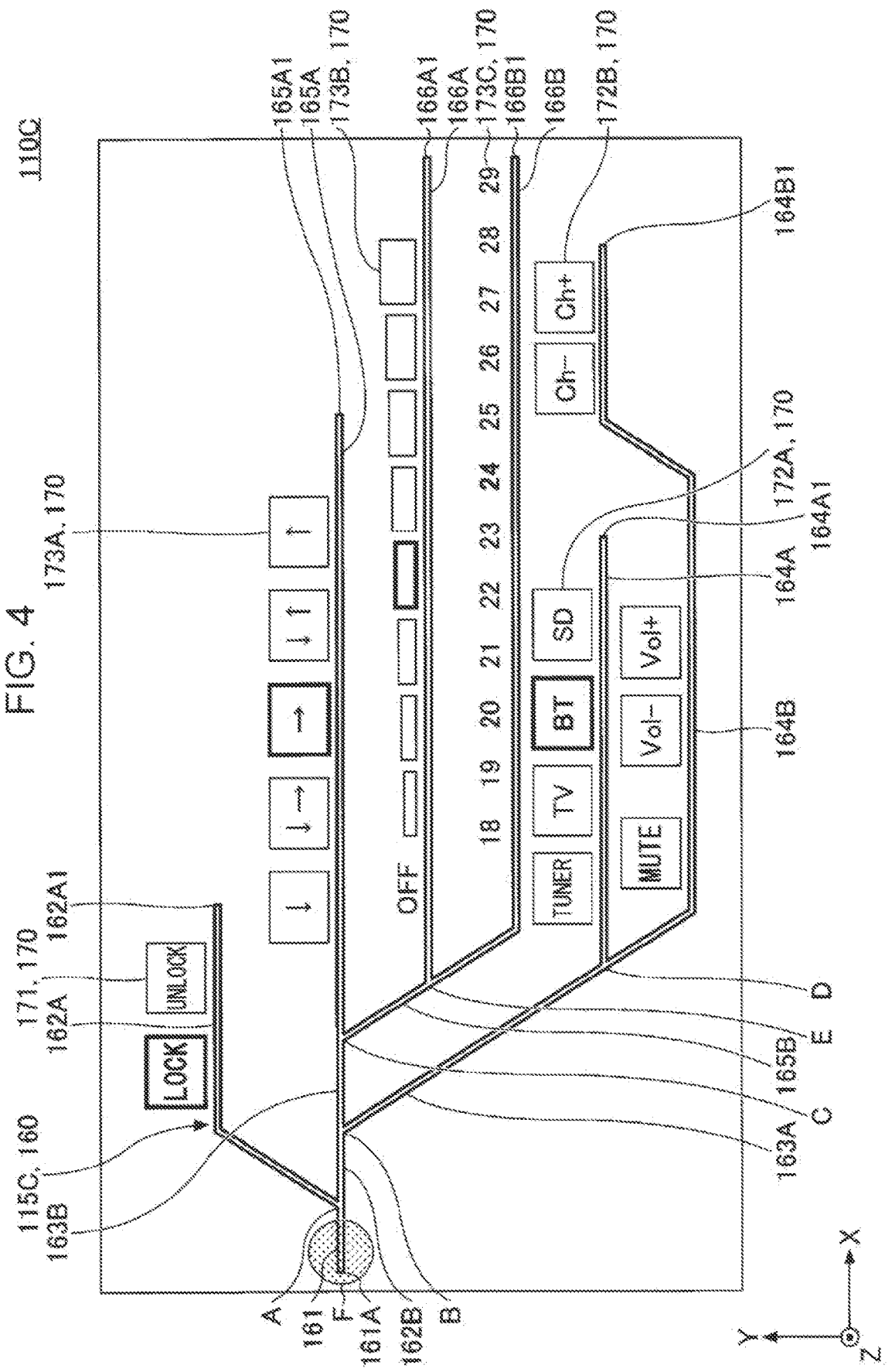
FIG. 4 illustrates another display on the input device.

When the finger F comes into contact with the pattern 161 as illustrated in FIG. 4, a shift occurs from the initial state to a state in which the pattern 161, the patterns 162A to 166B at lower hierarchical levels than the hierarchical level of the pattern 161, and the icons 171 to 173C are all lighted. Therefore, the user can visually recognize the functions, of the vehicle 10, that can be manipulated on the input device 100. When the user views the initial state many times while using the vehicle 10 many times, the user can learn the icons 170 of functions and the layout of the icons 170. This enables the user to intuitively manipulate the input device 100.

In FIG. 4, the LEDs 122 corresponding to the icons 171 (LOCK), 172A (BT), 173A (→), 173B (at the fourth level from the lowest level), and 173C (24), which represent currently selected settings, show a different luminescent color, which is a selection color, from the other LEDs 122. The LED 122 can emit light in two luminescent colors, a selection color shown when an icon is selected and a non-selection color shown when no icon is selected. In FIG. 4, the icons 171 (LOCK), 172A (BT), 173A (→), 173B (at the fourth level from the lowest level), and 173C (24) are highlighted by being boldfaced. The selection color is red and the non-selection color is blue, as an example.

Figure 5:
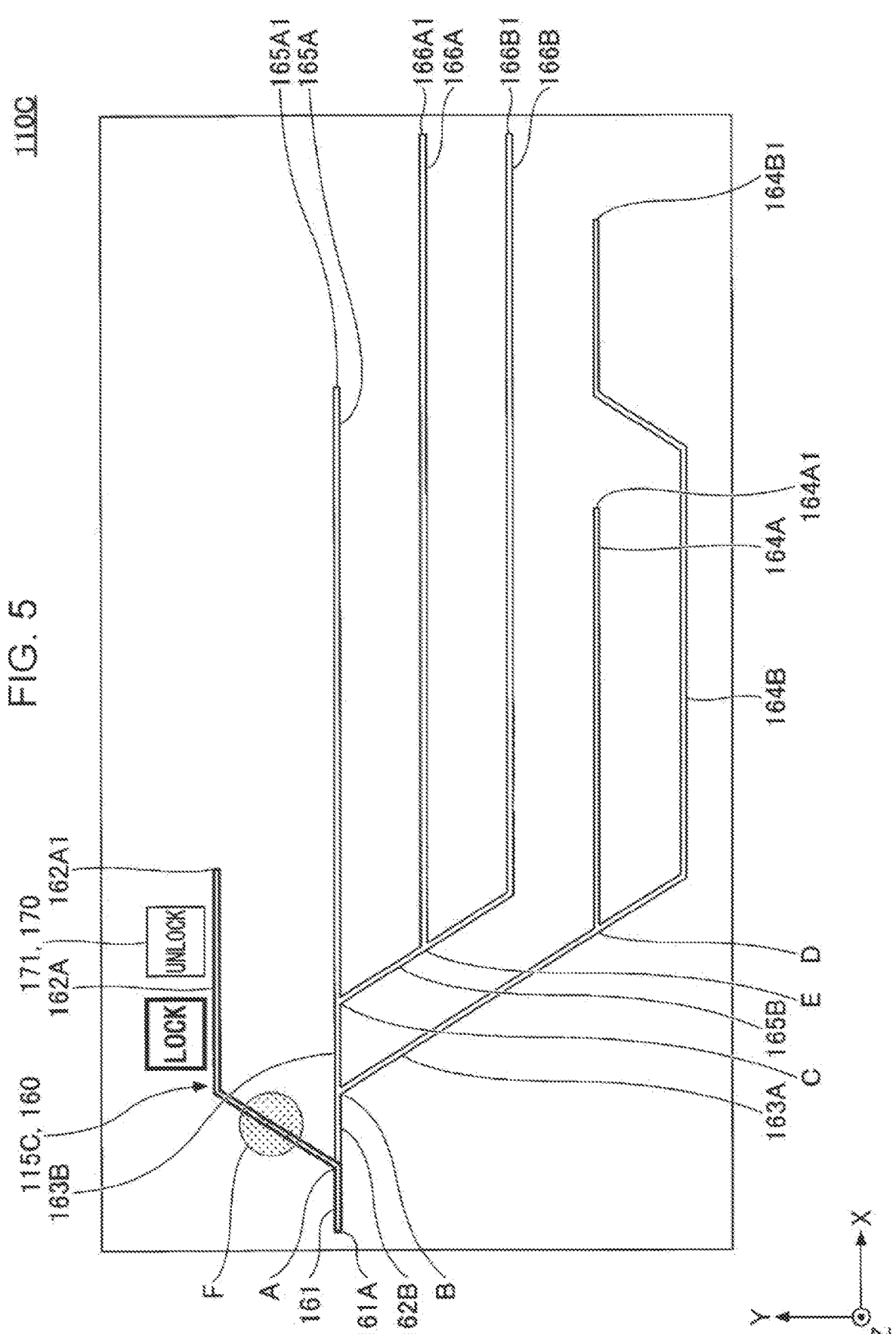
FIG. 5 illustrates another display on the input device.

When the finger F in the state illustrated in FIG. 4 is moved to pass through the point A and is further moved along the pattern 162A as illustrated in FIG. 5, a shift occurs to a state in which the pattern 162A on which the finger F is positioned, the two icons 171, and the pattern 161 between the finger F and the end 161A are lighted. The other patterns 162B to 166B and icons 172A to 173C go off. This is done for easy visual recognition of the pattern on which the finger F is positioned, the patterns on the low-end side with respect to the finger F, and the icons 171 on the low-end side with respect to the position of the finger F. The reason why the pattern 161 is kept in the lighted state is to guide the user when the user returns the finger F to the high-end side. In the state in FIG. 5, the pattern 161 may not be lighted.

Figure 6:
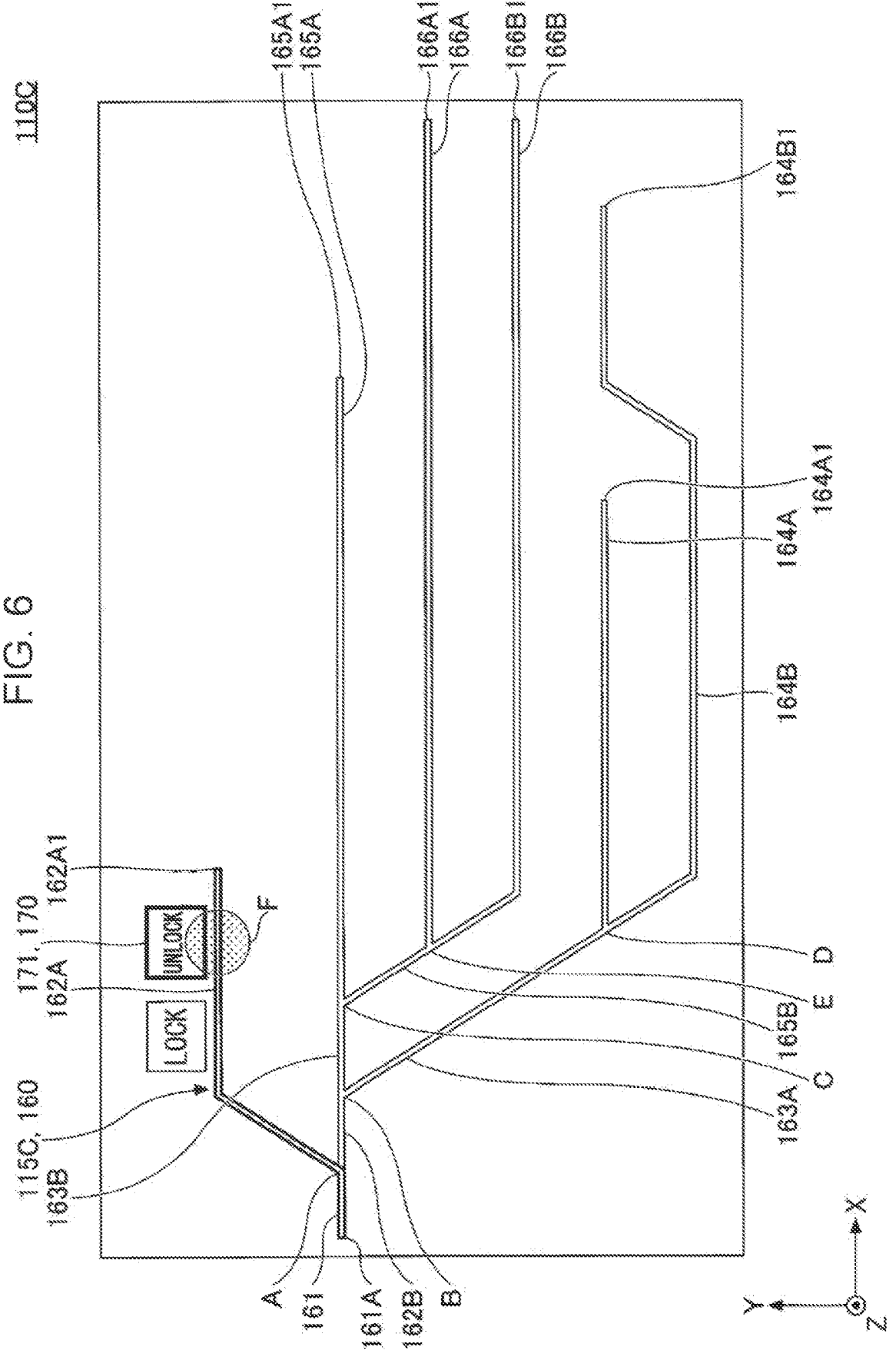
FIG. 6 illustrates another display on the input device.

When the finger F in the state in FIG. 5 is further moved in the +X direction and comes into contact with the icon 171 marked UNLOCK as illustrated in FIG. 6, the luminescent color of the icon 171 marked UNLOCK changes to the selection color and the luminescent color of the icon 171 marked LOCK returns to the non-selection color. When, in this state, the finger F is released from the surface of the outer layer 110C after the elapse of a certain time with the finger F in contact with the icon 171 marked UNLOCK, the selection of the icon 171 marked UNLOCK is established. The establishment of the selection of the icon 171 is not limited to the manipulation to release the finger F from the surface of the outer layer 110C after the elapse of a certain time with the finger F in contact with the icon 171. Possible examples of manipulations to establish the selection of the icon 171 are to detect the pressing of the icon 171 with the finger F by having the electrode seat 130 detect a change in capacitance or by using a separately provided pressure sensor, to tap or double-click the icon 171 with the position of the finger F left unchanged, to flick the icon 171 in a predetermined direction (the upward direction, for example) with the position of the finger F left unchanged, to stop the movement of the finger F for a while with the position of the finger F left unchanged, and to release the finger F from the outer layer 110C and then press a selection button immediately with the position of the finger F left unchanged. The selection button only needs to be placed at any position on the outer layer 110C.

Figure 7:
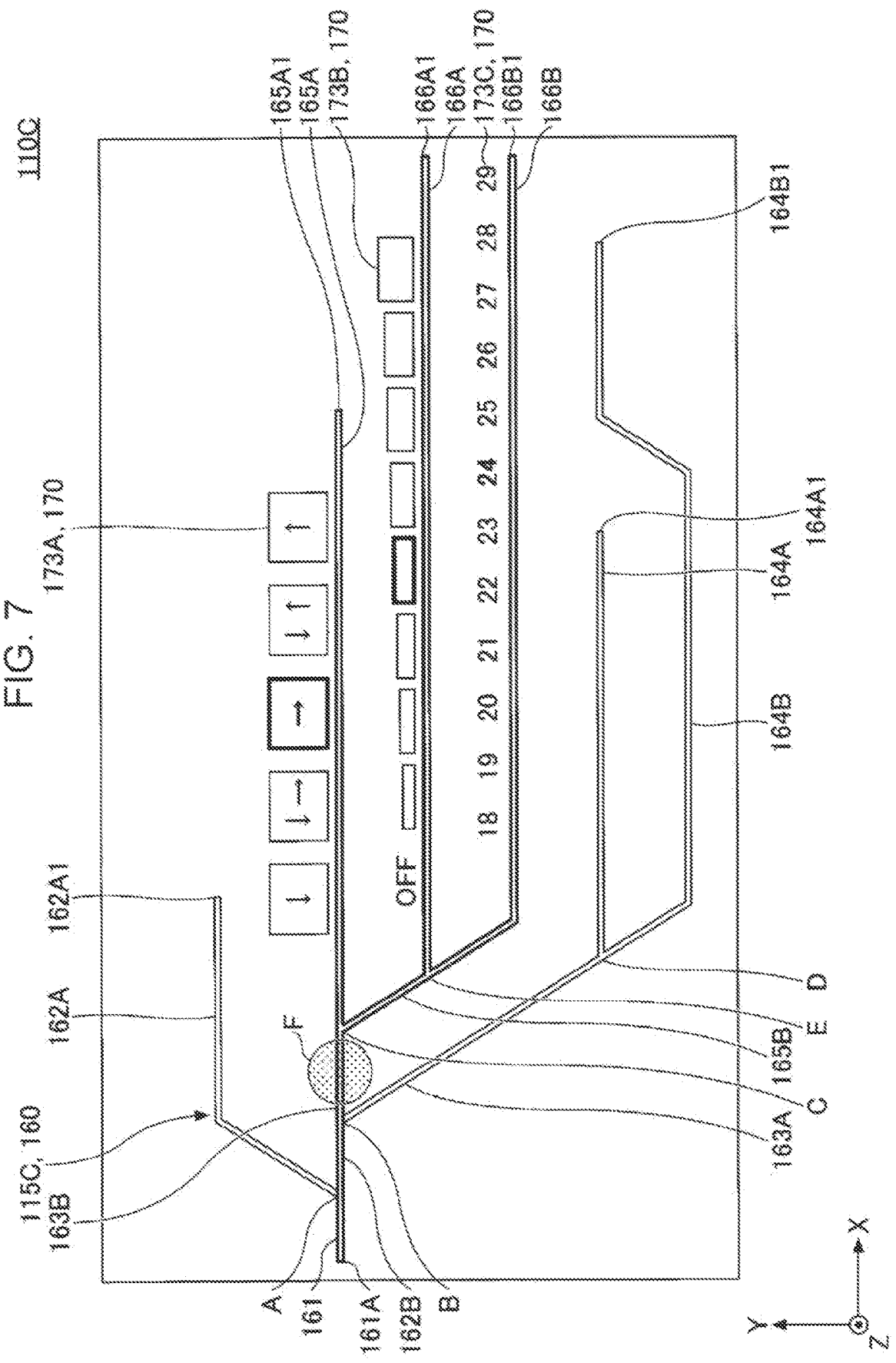
FIG. 7 illustrates another display on the input device.

When the finger F in the state in FIG. 5 is moved onto the pattern 163B, the pattern 163B on which the finger F is positioned, the patterns 165A, 165B, 166A and 166B on the low-end side with respect to the pattern 163B, the icons 173A to 173C, and the patterns 161 and 162B between the pattern 163B and the end 161A go on as illustrated in FIG. 7. This is done for easy visual recognition of the pattern on which the finger F is positioned, the patterns on the low-end side with respect to the finger F, and the icons 173A to 173C on the low-end side with respect to the position of the finger F. The reason why the patterns 161 and 162B between the finger F and the end 161A are kept in the lighted state is to guide the user when the user returns the finger F to the high-end side. In the state in FIG. 7, the patterns 161 and 162B may not be lighted.

Figure 8:
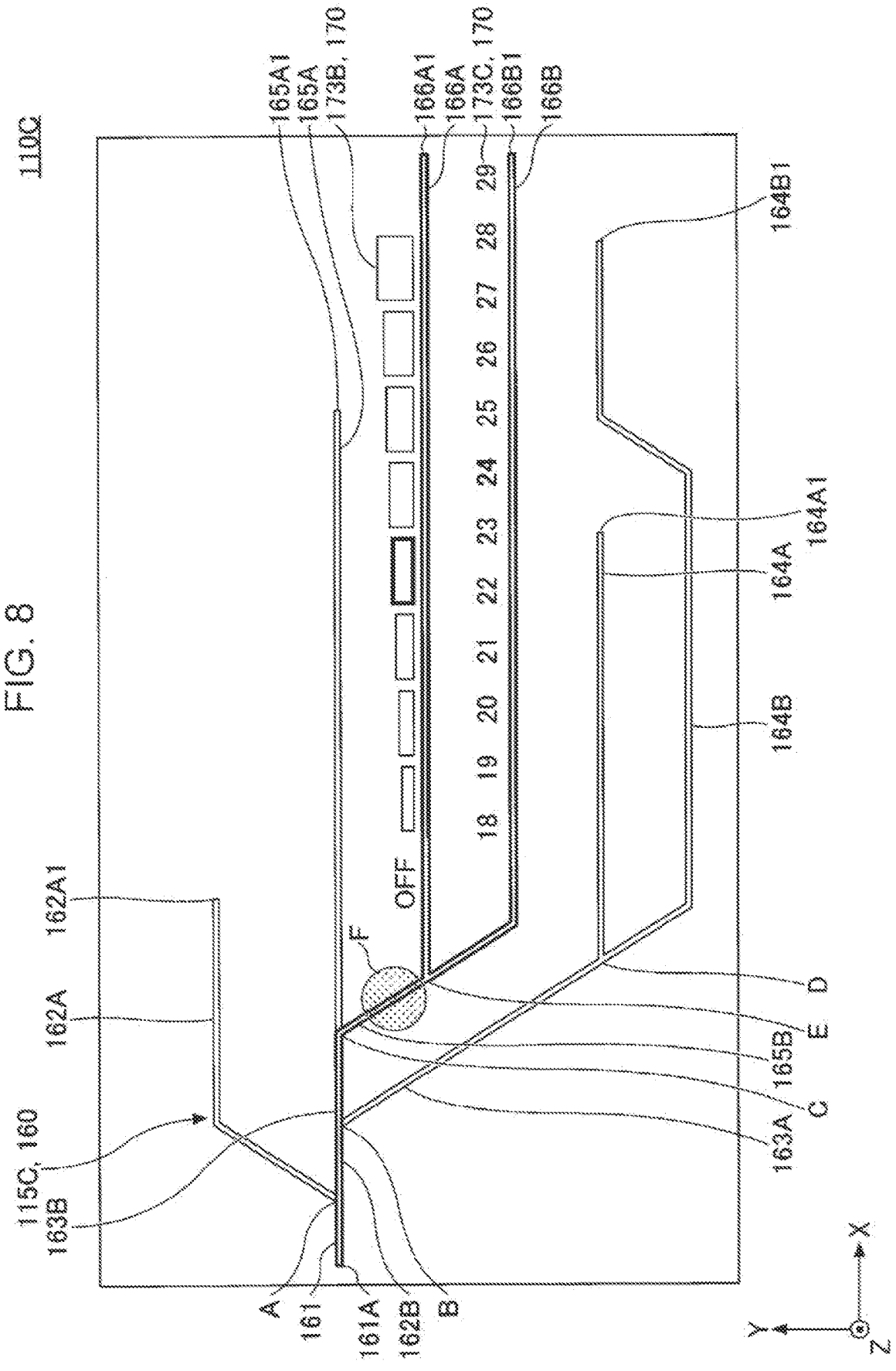
FIG. 8 illustrates another display on the input device.

When the finger F in the state in FIG. 7 is moved onto the pattern 165B, a shift occurs to a state in which the patterns 165B on which the finger F is positioned, the patterns 166A and 166B on the low-end side with respect to the pattern 165B, the icons 173B and 173C, and the patterns 161, 162B and 163B on the low-end side with respect to the pattern 165B go on, and the pattern 165A and icons 173A go off, as illustrated in FIG. 8. This is done for easy visual recognition of the pattern on which the finger F is positioned, the patterns on the low-end side with respect to the finger F, and the icons 173B and 173C on the low-end side with respect to the position of the finger F. The reason why the patterns 161, 162B, and 163B on the high-end side with respect to the position of the finger F are kept in the lighted state is to guide the user when the user returns the finger F to the high-end side. In the state in FIG. 8, the patterns 161, 162B and 163B may not be lighted.

Figure 9:
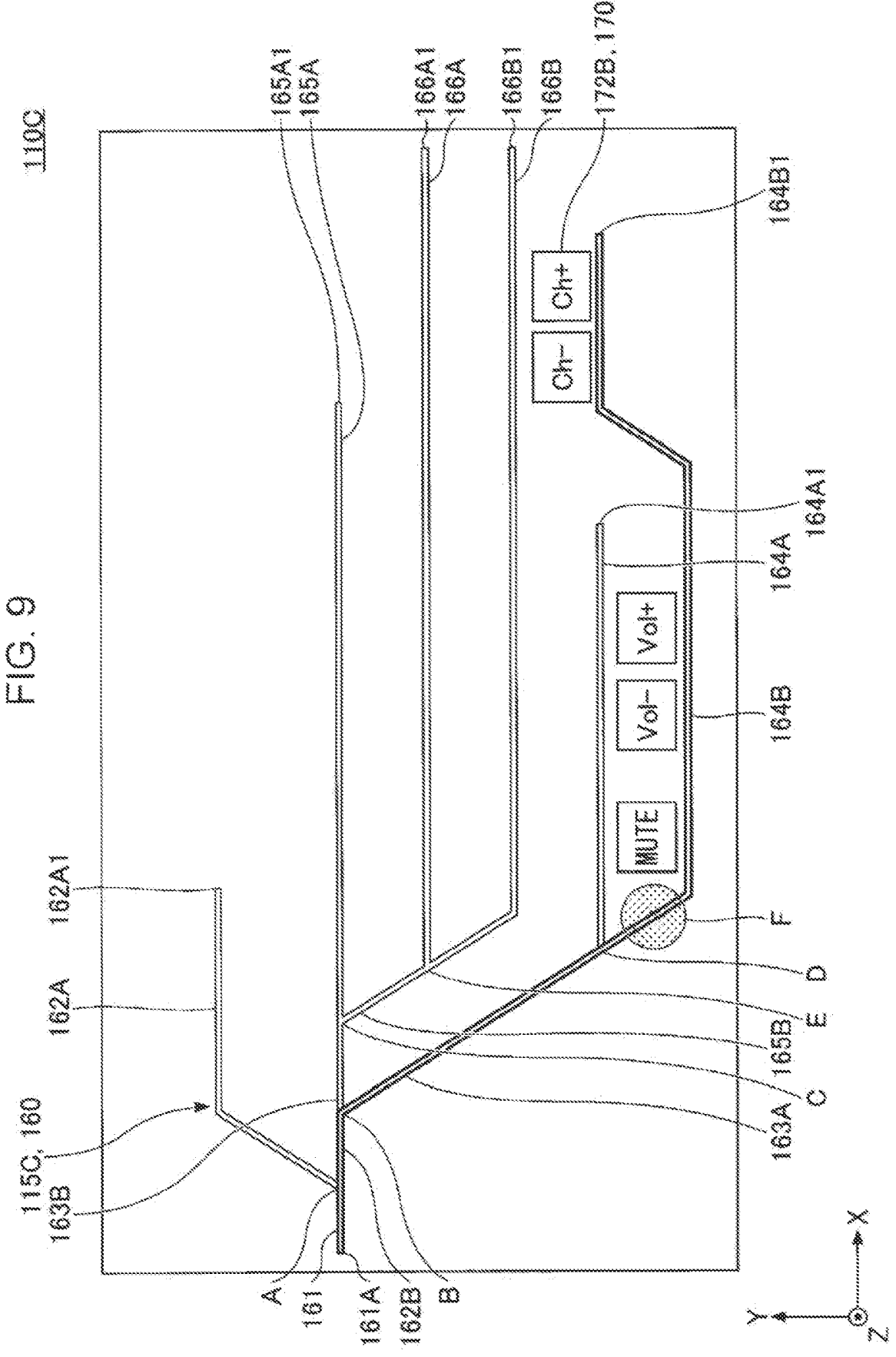
FIG. 9 illustrates another display on the input device.
Figure 10:
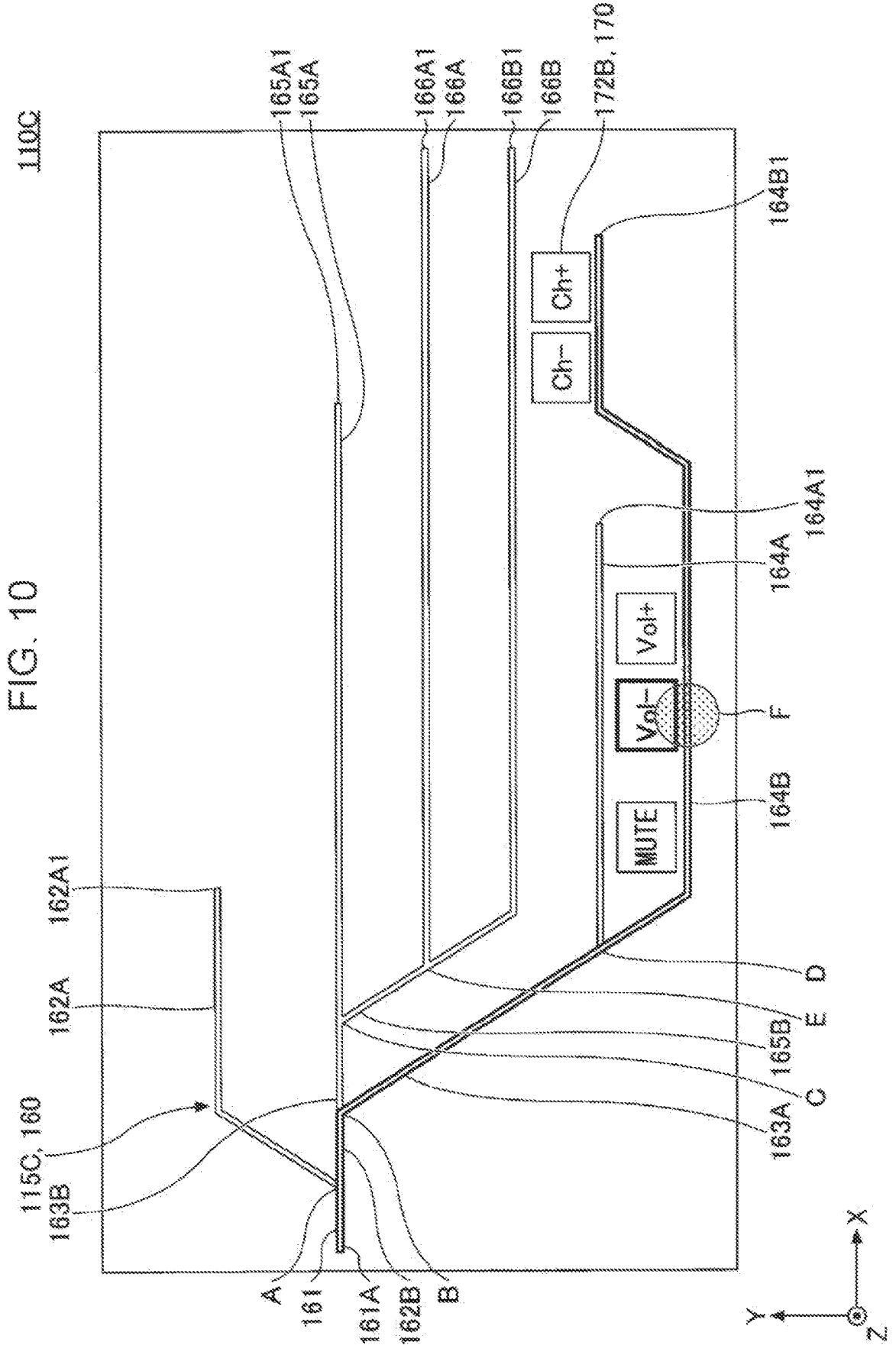
FIG. 10 illustrates another display on the input device.

When the user first touches the pattern 164B in the initial state (see FIG. 3), the pattern 164B on which the finger F is positioned, the icon 172B, and the patterns 161, 162B and 163A between the pattern 164B and the end 161A go on as illustrated in FIG. 9. This is done to accept a manipulation that may be performed when the user remembers the position of a desired icon and directly touches a desired pattern.

When the finger F in the state in FIG. 9 is moved in the +X direction along the pattern 164B and is stopped on the icon 172B marked VOL– representing a drop in volume, the luminescent color of the icon 172B marked VOL– is switched to the selection color. In this state, a countdown for the volume of the audio device continues while the finger F is in contact with the icon 172B marked VOL–. The volume is lowered by an amount equal to the countdown performed during a time while the finger F is in contact with the icon 172B marked VOL–. When the finger F is released from the outer layer 110C, the volume at that time is set.

Figure 11:
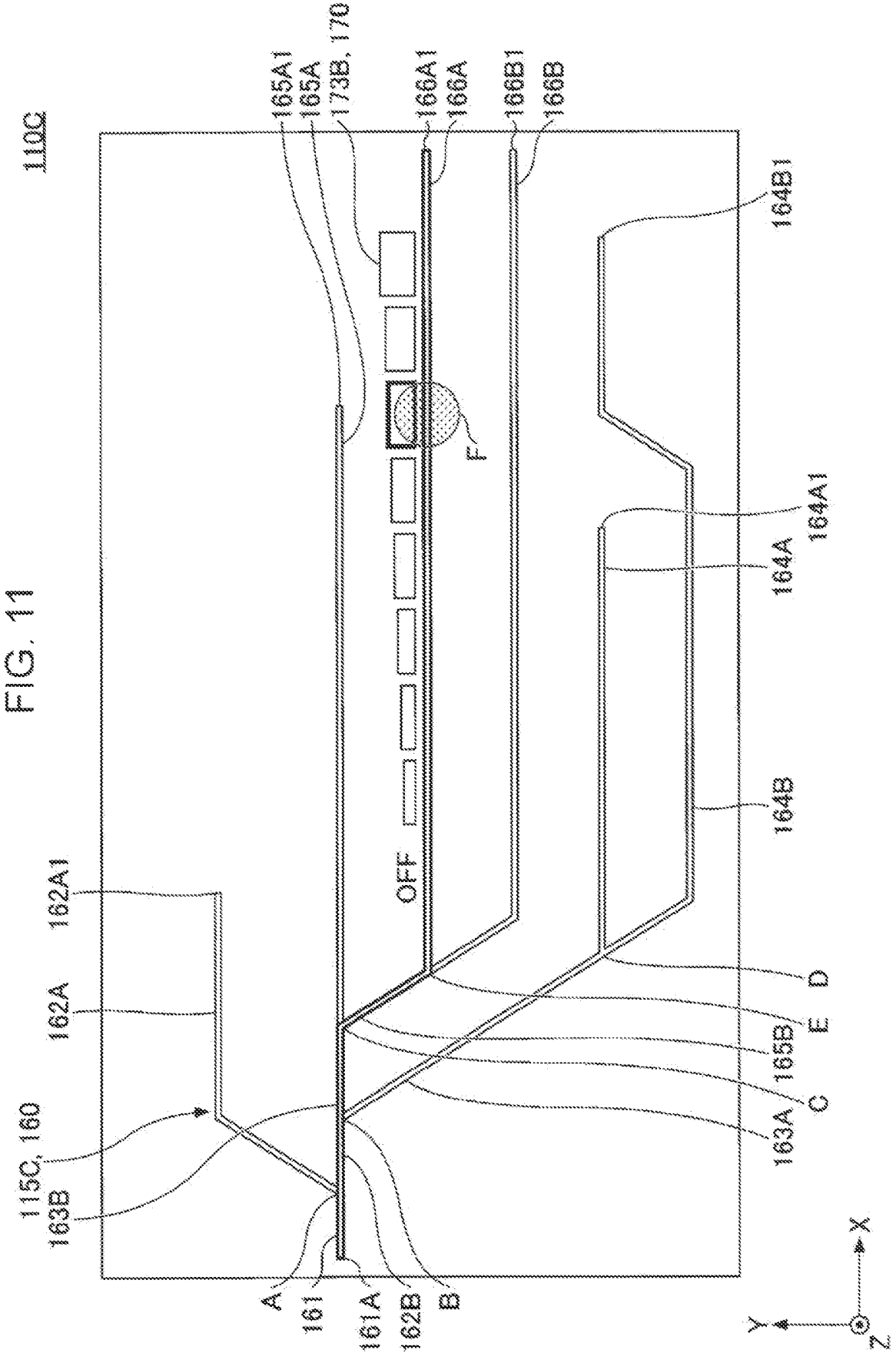
FIG. 11 illustrates another display on the input device.
Figure 12:
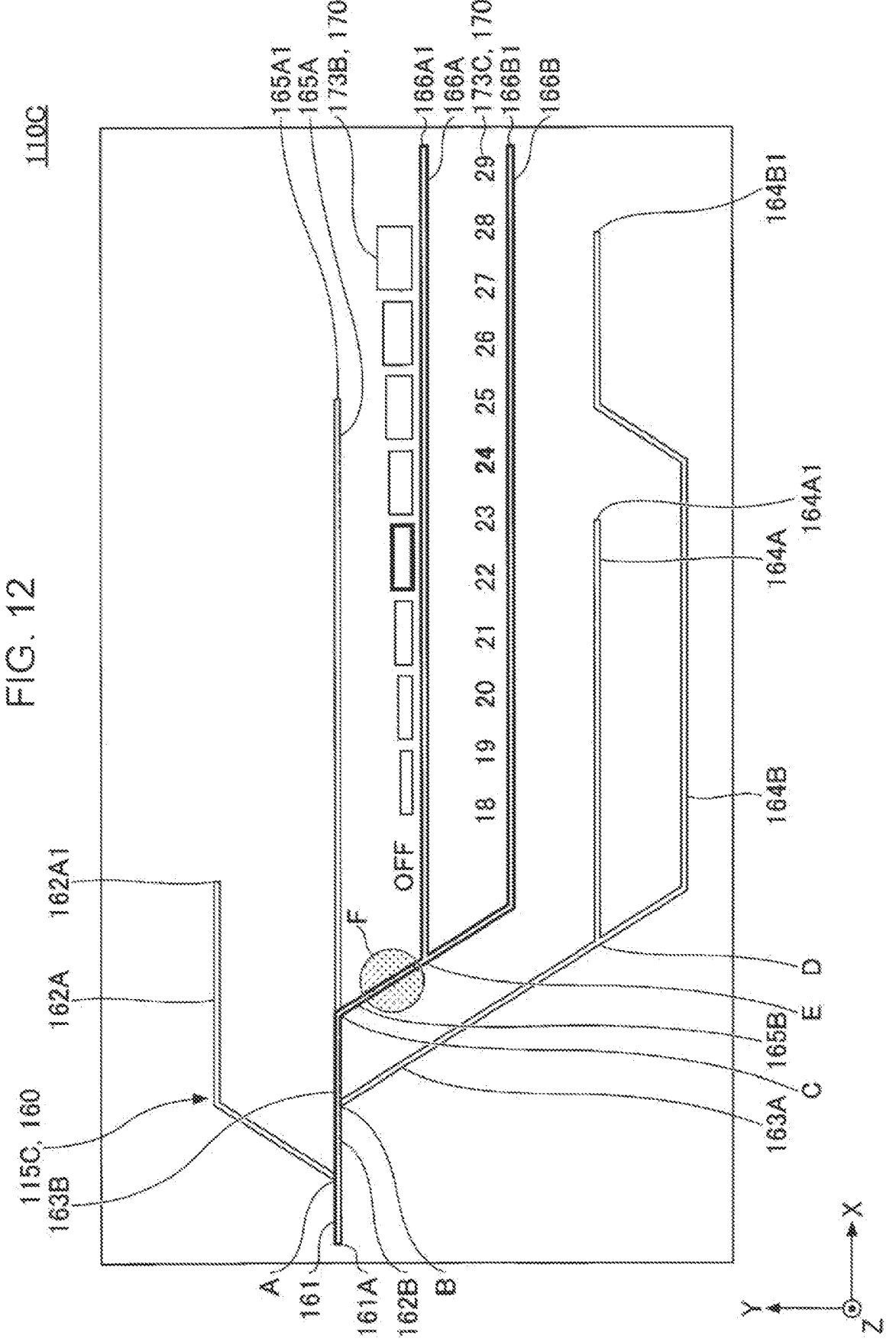
FIG. 12 illustrates another display on the input device.

When the finger F is moved to a position on the high-end side in the state as illustrated in FIG. 11 in which the finger F is in contact with the pattern 166A and with the sixth icon 173B involved in the setting of an air flow rate, the pattern 166A, icons 173B, and patterns 161, 162B, 163B and 165B are lighted, and the sixth icon 173B involved in the setting of an air flow rate is in the selection color, the display shifts as illustrated in FIG. 12.

In FIG. 12, the finger F has been moved to the pattern 165B. Therefore, the pattern 166B and icons 173C are further lighted unlike the state in FIG. 11. In addition, the luminescent color of the sixth icon 173B involved in the setting of an air flow rate has been returned from the selection color to the non-selection color.

Figure 13:
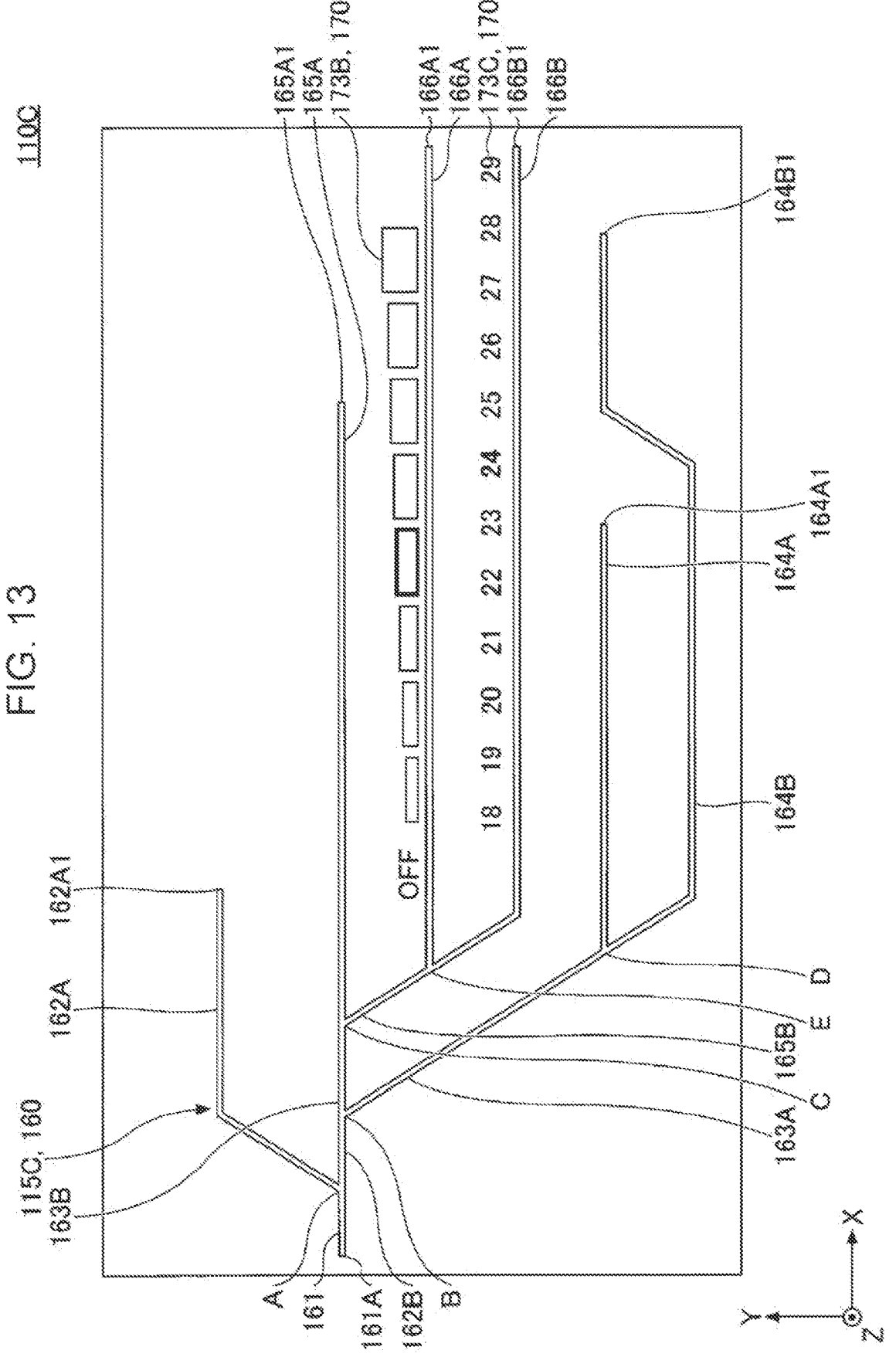
FIG. 13 illustrates another display on the input device.

When the finger F in FIG. 12 is moved to the icon 173C marked 24, which is used to set the temperature setting of the air conditioner to 24 degrees, and the finger F is released from the outer layer 110C to establish the temperature setting, the lighted state of the icon 173C marked 24 in the selection color may be kept for several seconds as illustrated in FIG. 13 without making the icon 173C marked 24 immediately go off. Thus, the user can visually recognize the established setting when the user sees the input device 100 after the user has released the finger F from the outer layer 110C. This enhances usability. In this case, when the setting of an icon 173B involved in the setting of an air flow rate has been established in succession as part of a series of manipulations without the finger F being released, the icon 173B may go on similarly and may be held in the selection color. Furthermore, when a manipulation for the air conditioner has been established, all icons involved in the settings of the air conditioner, which are in the same high-end category, may be lighted. In this case, the currently selected icon may be held in the selection color.

Figure 14:
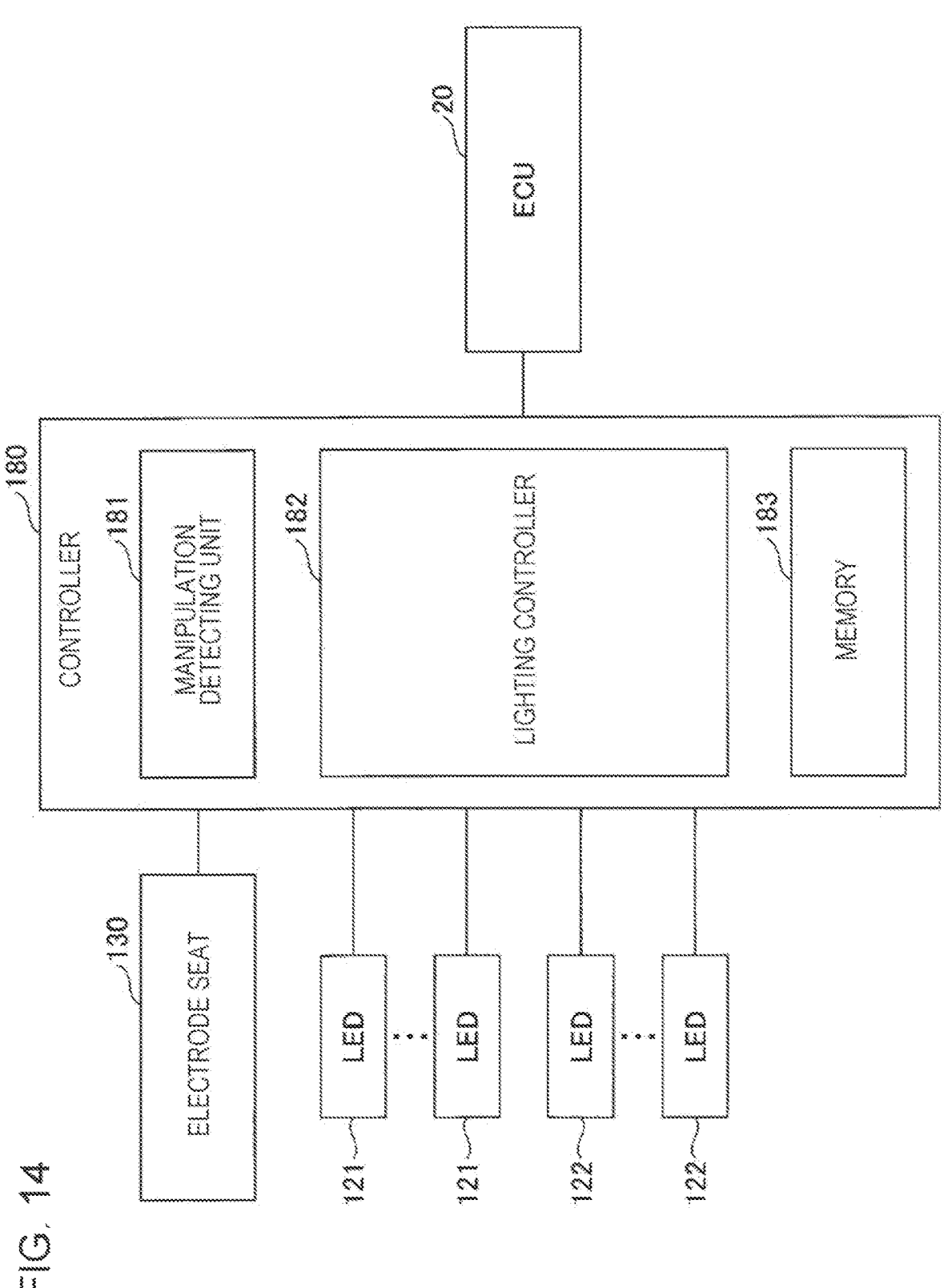
FIG. 14 illustrates the structure of a controller.

FIG. 14 illustrates the structure of a controller 180 included in the input device 100 (see FIG. 1). The controller 180 is implemented by a computer that includes a central processing unit (CPU), a random-access memory (RAM), a read-only memory (ROM), an input/output interface, an internal bus, and the like. An electronic control unit (ECU) 20 is connected to the controller 180. The ECU 20 controls the air conditioner, the audio device, and other device in the vehicle 10. The ECU 20 may be of a type that controls autonomous driving functions. The ECU 20 may be a plurality of ECUs, each of which is independent for one device, or may be a single ECU that implements all functions.

The controller 180 has a manipulation detecting unit 181, a lighting controller 182, and a memory 183. The manipulation detecting unit 181 and lighting controller 182 represent functions of programs executed by the controller 180 as functional blocks. The memory 183 functionally represents memories in the controller 180.

The manipulation detecting unit 181 preferably detects the position at which a manipulation was performed on the outer layer 110C, according to the result of detection by the electrode seat 130. The manipulation detecting unit 181 transmits data of the detected position to the lighting controller 182. When the manipulation detecting unit 181 decides that a manipulation has been established, the manipulation detecting unit 181 transmits data representing the established manipulation to the ECU 20. As an example, the manipulation detecting unit 181 detects the position of the finger F described with reference to FIGS. 3 to 13.

The lighting controller 182 preferably controls the lighting of a plurality of LEDs 121 and a plurality of LEDs 122 according to the position data transmitted from the manipulation detecting unit 181. As an example, the lighting controller 182 preferably controls the lighting of the plurality of LEDs 121 and plurality of LEDs 122 described with reference to FIGS. 3 to 13.

The memory 183 stores programs and data that are needed by the manipulation detecting unit 181 and lighting controller 182 to execute processing. The memory 183 also stores coordinate data, on the outer layer 110C, of the patterns 161 to 166B included in the tree-like pattern 160, coordinate data, on the outer layer 110C, of the icons 171 to 173C, data representing the correspondence between the patterns 161 to 166B and the plurality of LEDs 121, and the correspondence between the icons 171 to 173C and the plurality of LEDs 122.

Figure 15:
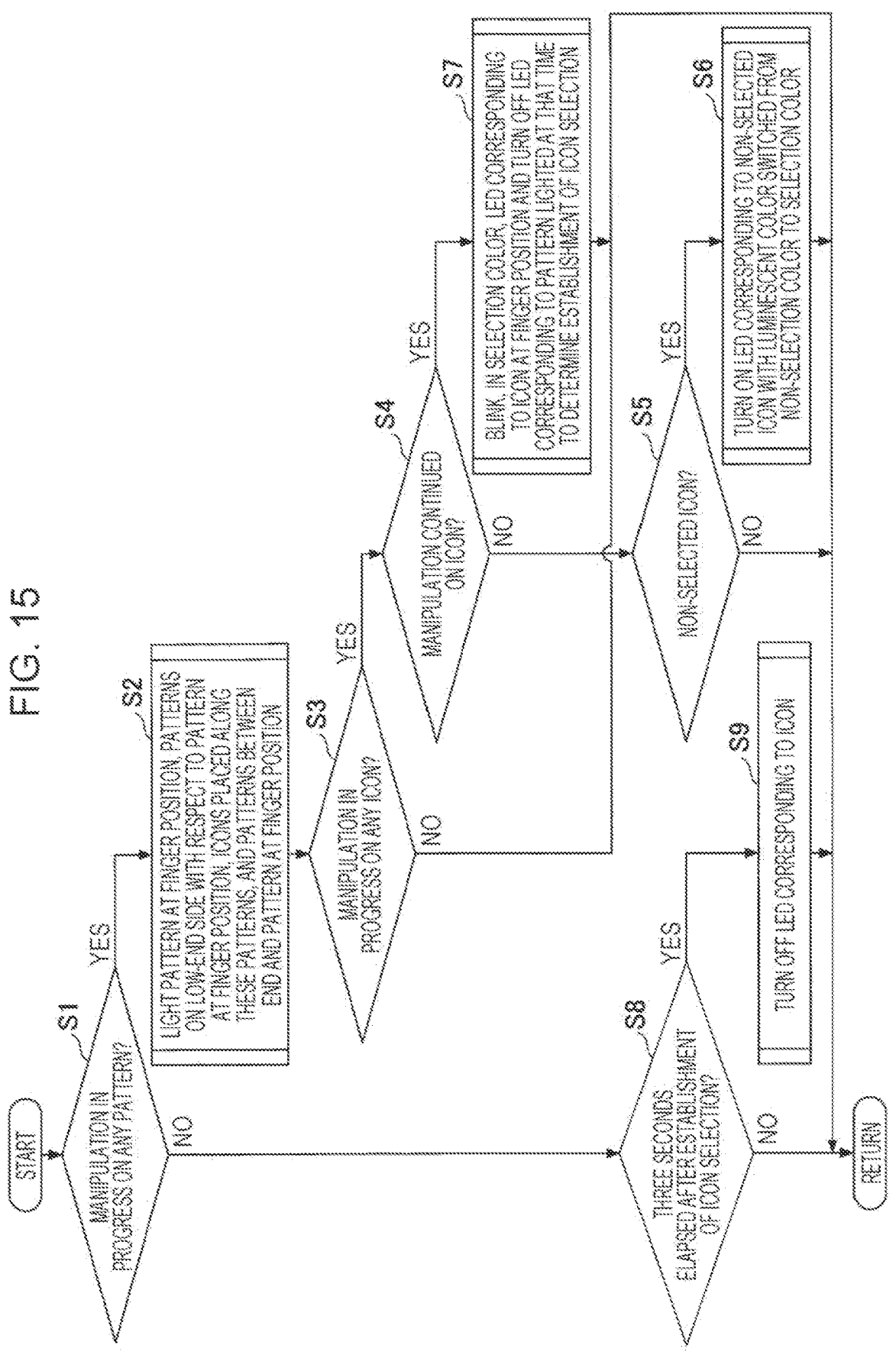
FIG. 15 is a flowchart illustrating processing executed by the controller.

FIG. 15 is a flowchart illustrating processing executed by the controller 180. The controller 180 repeatedly executes the processing in FIG. 15. The flowchart in FIG. 15 is just an example of processing executed by the controller 180. The controller 180 can also execute processing that is not indicated in this flowchart.

When the processing starts, the manipulation detecting unit 181 decides whether a manipulation is in progress on any pattern (step S1).

If the manipulation detecting unit 181 decides that a manipulation is in progress on any pattern (Yes in step S1), the lighting controller 182 lights the pattern on which the finger F is positioned, patterns on the low-end side with respect to the pattern on which the finger F is positioned, icons placed along these patterns, and patterns between the end 161A and the pattern on which the finger F is positioned (step S2). Although the icons are lighted in the non-selection color, the selected icon may be lighted in the selection color to indicate the current selection.

The manipulation detecting unit 181 decides whether a manipulation is in progress at the position of any icon (step S3). This is done to decide whether the user is in contact with any icon.

If the manipulation detecting unit 181 decides that a manipulation is in progress at the position of any icon (Yes in step S3), the manipulation detecting unit 181 decides whether the manipulation at the position of the icon has been continued for a predetermined time or more (step S4). This is done to decide whether the user is selecting any icon. The predetermined time only needs to be set in the range of about 0.1 second to about 0.5 second.

If the manipulation detecting unit 181 decides that the manipulation at the position of the icon has not been continued for the predetermined time or more (No in step S4), the manipulation detecting unit 181 decides whether the icon is a non-selected icon (step S5). The non-selected icon is an icon corresponding to an LED 122 the light luminescent color of which has not been changed to the selection color and that thereby emits light in the non-selection color.

If the manipulation detecting unit 181 decides the icon is a non-selected icon (Yes in step S5), the lighting controller 182 turns on the LED 122 corresponding to the icon with the luminescent color switched from the non-selection color to the selection color (step S6). Upon the termination of processing in step S6, the flow returns to decide whether a manipulation is to be performed for any other pattern.

The flow also returns even if the manipulation detecting unit 181 decides in step S5 that the icon is not a non-selected icon (No in step S5). In this case, the icon is lighted in the selection color, but a decision has been made in step S4 that the predetermined time has not elapsed.

If the manipulation detecting unit 181 decides in step S4 that the manipulation has been continued at the position of the icon for the predetermined time or more (Yes in step S4), the lighting controller 182 causes the LED 122 corresponding to the icon at the position of the finger F to blink in the selection color and turns off the LED 121 corresponding to the pattern lighted at that time. Then, the manipulation detecting unit 181 determines that the selection of the icon has been established (step S7). Then, the manipulation detecting unit 181 transmits, to the ECU 20, data representing the type of the icon for which selection has been established, after which the ECU 20 performs control to operate the device, in the vehicle 10, that corresponds to the icon. When, for example, a manipulation is performed on the icon 172B marked VOL–, the volume of the audio device is lowered. Upon the termination of processing in step S7, the flow returns to decide whether a manipulation is to be performed for any other pattern. Although, in this embodiment, a manipulation is established only when the manipulation is continued for a predetermined time or more, the establishment may be based on a change in pressure applied to the manipulation panel during the manipulation or on a change in a contact area.

If the manipulation detecting unit 181 decides in step S3 that a manipulation is not in progress at the position of any icon (No in step S3), the flow returns to decide whether a manipulation is to be performed for any other pattern.

If the manipulation detecting unit 181 decides in step S1 that a manipulation is not also in progress on any pattern (No in step S1), the manipulation detecting unit 181 decides whether three seconds has elapsed after the selection of the icon was established in step S7 (step S8). The three seconds, which is an example, after the selection of the icon was established, is to allow for keeping the LED 122 corresponding to the icon turned on in the selection color. When the icon is kept lighted in the selection color even after the selection of the icon is established and then the user releases the finger F from the outer layer 110C, the user can visually recognize the function for which the manipulation has been established.

If the manipulation detecting unit 181 decides that three seconds has not elapsed (No in step S8), the flow returns. If the manipulation detecting unit 181 decides that three seconds has elapsed (Yes in step S8), the lighting controller 182 turns off the LED 122 corresponding to the icon (step S9). This completes a series of processing. Upon the completion of the processing in step S9, the flow returns to decide whether a manipulation is to be performed for any other pattern.

Although not illustrated in the flowchart, if manipulations are concurrently performed in two or more low-end manipulation areas, the manipulation detecting unit 181 may decide that these manipulations are unintentional and may ignore detection results for these manipulations. When the detection results are ignored, the two positions detected by the manipulation detecting unit 181 are output to neither the lighting controller 182 nor the ECU 20. If the arm touches the outer layer 110C immediately after the finger F touches the outer layer 110C, for example, the manipulation detecting unit 181 also decides that the manipulation is unintentional and ignores the detection result for the manipulation. When the contact area of a touch to the outer layer 110C has a predetermined size or more, the manipulation is likely to be unintentional. In this case as well, the manipulation detecting unit 181 may ignore the detection result for the manipulation. This is because, for example, the arm or another part of the body may unintentionally touch the outer layer 110C. In detection as for the contact area, a change in capacitance detected by the electrode seat 130 can be used.

The manipulation detecting unit 181 may be structured so as to detect a manipulation in the manipulation area only while the vehicle 10 is autonomously driven. In this case, control processing described above with reference to the flowchart can be executed only during autonomous driving. Autonomous driving may be implemented by autonomous driving functions at various levels stipulated by, for example, the SAE International in the United States. Thus, even when part of the body unintentionally touches the manipulation area during normal driving, it is possible to prevent the touch from being mistakenly regarded as a manipulation.

As described above, the input device 100 detects manipulations on the tree-like pattern 160, which is formed by the convex portion 115C so as to be continuous in hierarchical form and to be recognizable through a tactile response to a fingertip or the like, and on the icons 170 disposed along the tree-like pattern 160. Therefore, the icons 170 can be easily manipulated along the tree-like pattern 160. Furthermore, since the tree-like pattern 160 is in hierarchical form, relationships among the icons 170 can be intuitively recognized easily, so manipulations are eased.

Therefore, the input device 100 superior in maneuverability can be provided. Since the tree-like pattern 160 is formed by the convex portion 115C of the outer layer 110C, the tree-like pattern 160 can be visually recognized and can be easily recognized through a tactile response to a fingertip or the like. Therefore, maneuverability can be enhanced. Although, in the above embodiment, the convex portion 115C of the outer layer 110C has been formed by the convex portion 111 of the board 110A, the convex portion 115C may be formed directly on the surface of the outer layer 110C. A concave portion may be formed instead of the convex portion 115C. Alternatively, small concave portions and convex portions may be continuously formed instead of the convex portion 115C. This is because even if a concave portion or a combination of concave portions and convex portions is formed, the tree-like pattern 160, which is continuous in hierarchical form and is recognizable through a tactile response to a fingertip or the like, can be implemented.

The convex portion 115C is formed from a transparent or translucent resin so that the tree-like pattern 160 formed by the convex portion 115C is displayed by being lighted. In addition, the input device 100 includes a plurality of LEDs 121 placed along the convex portion 115C. Therefore, visibility for individual portions of the tree-like pattern 160 is enhanced. Thus, it is possible to provide the input device 100 that is more superior in maneuverability.

The input device 100 also includes a plurality of LEDs 122 in correspondence to icons 170 so that the icons 170 are displayed by being lighted as well as gel seats 150 on which mask sheets 151, each of which represents one icon 170, are printed. Therefore, the visibility of each icon 170 is enhanced and the function of the icon 170 can be visually recognized. Thus, it is possible to provide the input device 100 that is more superior in maneuverability.

The high-end manipulation area and low-end manipulation area are respectively provided on the high-end side and low-end side with respect to each of the points A to E on the tree-like pattern 160. Therefore, relationships among the icons 170 can be intuitively recognized easily according to the hierarchy. Thus, it is possible to provide the input device 100 that is more superior in maneuverability.

When a manipulation is performed in any high-end manipulation area, the input device 100 lights and displays the patterns and icons included in one or a plurality of low-end manipulation areas present on the low-end side with respect to the high-end manipulation area. When a manipulation is performed in any low-end manipulation area, the input device 100 lights and displays the patterns and icons included in the low-end manipulation area. Therefore, a function to be selected can be sequentially recognized easily according to the hierarchy. Thus, it is possible to provide the input device 100 that is more superior in maneuverability.

When a manipulation is performed in any low-end manipulation area, the input device 100 lights and displays the patterns and icons included in the low-end manipulation area and the high-end manipulation areas present on the high-end side with respect to the low-end manipulation area. Therefore, not only the functions included in the low-end manipulation area but also the functions included in the high-end manipulation areas on the high-end side with respect to the low-end manipulation area can be sequentially recognized easily according to the hierarchy. Therefore, the user can easily grasp the structure of the tree-like pattern 160, for example, when the user confirms patterns (branches) in the high-end manipulation areas on the high-end side with respect to the low-end manipulation area in which a manipulation is in progress or when the user returns from the low-end manipulation area in which a manipulation is in progress to a high-end manipulation area. Thus, it is possible to provide the input device 100 that is more superior in maneuverability.

When a manipulation is performed at the high end in any low-end manipulation area, the input device 100 lights and displays all patterns and icons included in the low-end manipulation area. Therefore, all selectable functions can be sequentially recognized easily according to the hierarchy, so the user can easily grasp the structure of the tree-like pattern 160. Thus, it is possible to provide the input device 100 that is more superior in maneuverability.

When a manipulation is performed at a point toward the lower end in any low-end manipulation area, the input device 100 preferably makes the patterns and icons go off that are positioned in the low-end manipulation area and on the high-end side with respect to the manipulation position. Therefore, the icons on the low-end side with respect to the manipulation point can be easily recognized. Thus, it is possible to provide the input device 100 that is more superior in maneuverability.

The panel 110 is preferably a door panel, on the interior side, of the door 50 of the vehicle 10. High-end manipulation areas and low-end manipulation areas are preferably placed along the front-back direction of the vehicle 10. Since hierarchical levels are different in the front-back direction, the direction in which the hierarchical levels are provided can be easily recognized. Thus, it is possible to provide the input device 100 that is more superior in maneuverability. Although, in the above description, the back side of the vehicle 10 has been on the high-end side and the front side of the vehicle 10 has been on the low-end side, this may be reversed.

Although, in the above description, high-end manipulation areas and low-end manipulation areas have been placed along the front-back direction of the vehicle 10, they may be placed in the vertical direction. In this case, since different hierarchical levels are positioned in the vertical direction, the direction in which the hierarchical levels are positioned can be easily recognized. Thus, it is possible to provide the input device 100 that is more superior in maneuverability. The upper side may be the high-end and the lower side may be the low end, or this may be reversed.

Icons included in the low-end manipulation area are involved in a common function. Therefore, a manipulation can be easily performed for each function, and the position at which a desired function is assigned can be easily recognized according to the hierarchy. Thus, it is possible to provide the input device 100 that is more superior in maneuverability.

When the manipulation detecting unit 181 is structured so that when manipulations are concurrently performed in two or more low-end manipulation areas, the manipulation detecting unit 181 ignores detection results for these manipulations, even if, for example, two portions of the body mistakenly touch the surface of the outer layer 110C, patterns and icons are not lighted against the user's intention. In addition, it is possible to restrain devices in the vehicle 10 from being controlled by the ECU 20. The manipulation detecting unit 181 may be structured so that when manipulations are substantially concurrently performed in two or more low-end manipulation areas, the manipulation detecting unit 181 accepts a first manipulation and ignores manipulations that are subsequently performed.

As described above, the manipulation detecting unit 181 may be structured so as to detect a manipulation in the manipulation area only while the vehicle 10 is autonomously driven. In this case, even when an intentional contact with the manipulation area is detected during normal driving, it is possible to prevent the touch from being mistakenly regarded as a manipulation. When execution is made possible only during autonomous driving, more icons that can implement various functions can be included than icons that the user can manipulate during driving. Thus, it is possible to provide the input device 100 on which manipulations can be performed for a greater variety of functions.

Figure 16:
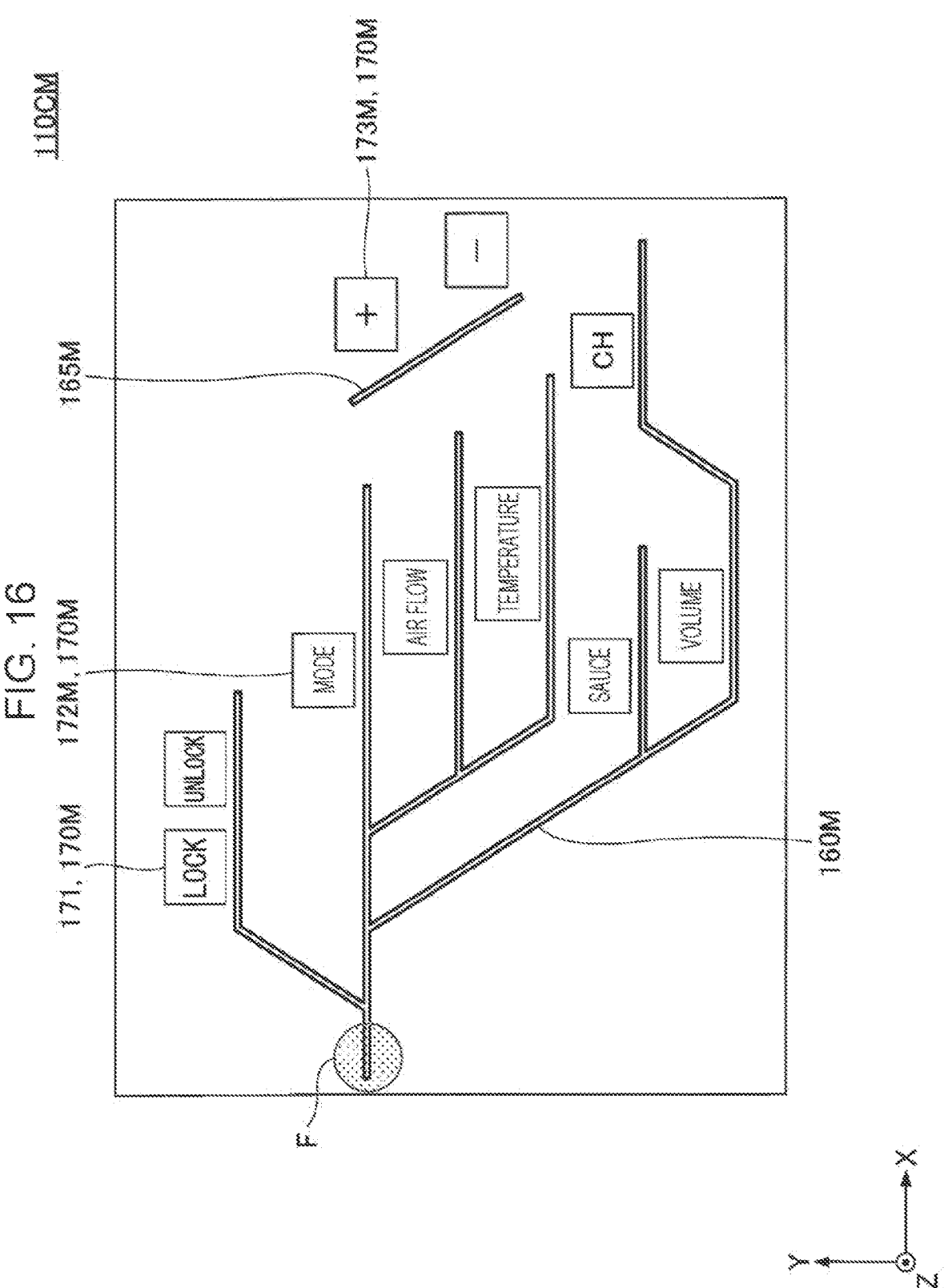
FIG. 16 illustrates the placement of a tree-like pattern, a pattern, and icons on an outer layer in a variation of the embodiment.

A placement as illustrated in FIG. 16 may be used instead of the tree-like pattern 160 and icons 170 described above. FIG. 16 illustrates the placement of a tree-like pattern 160M, a pattern 165M, and icons 170M on an outer layer 110CM in a variation of the embodiment.

The tree-like pattern 160M is a miniaturized version of the tree-like pattern 160 illustrated in FIG. 2. In addition to the tree-like pattern 160M, the pattern 165M, which is linear and is separated from the tree-like pattern 160M, is provided. The icons 170M include two icons 171 marked LOCK and UNLOCK as in FIG. 2, six icons 172M, and two icons 173M.

As examples of the icons 172M for use for the air conditioner, icons to select a mode, an air flow rate, and a temperature setting are disposed along patterns (branches) of the tree-like pattern 160M. As the icons 172M for used for the audio device, icons to select a source (sound source), a volume, and CH representing a channel are disposed along patterns (branches) of the tree-like pattern 160M. The two icons 173M disposed along the pattern 165M are used to select + or −.

When any one of the icons 172M for use for the air conditioner, which are marked MODE, AIR FLOW RATE, and TEMPERATURE, is selected and the two icons 173M are manipulated, mode switching can made, the air flow rate can be increased or decreased, and the temperature setting can be raised or lowered. When any one of the icons 172M for use for the audio device, which are marked SOURCE, VOLUME, and CH, is selected and the two icons 173M are manipulated, a source can be selected, the volume can be adjusted, and a channel can be selected. When the icons 173M used to select + or − is provided separately from the tree-like pattern 160M as described above, the downsizing of tree-like pattern 160M can be achieved.

So far, the tree-like pattern 160 and icons 170 have been lighted by the LEDs 121 and 122. However, neither the tree-like pattern 160 nor the icons 170 may not be lighted or one of the tree-like pattern 160 and icons 170 may not be lighted. When the icons 170 are not lighted, the icons 170 may be provided on the surface of the outer layer 110C by, for example, embossing or printing.

When neither the tree-like pattern 160 nor the icons 170 are lighted, a capacitance detection electrode 130M may be provided, instead of the electrode seat 130, at a position at which the capacitance detection electrode 130M coincides with the tree-like pattern 160 in plan view without the LEDs 121 and 122 being provided on the surface of the circuit board 120. The capacitance detection electrode 130M only needs to be disposed on the surface of the circuit board 120. Patterns of the capacitance detection electrode 130M are illustrated in FIG. 17.

Figure 17:
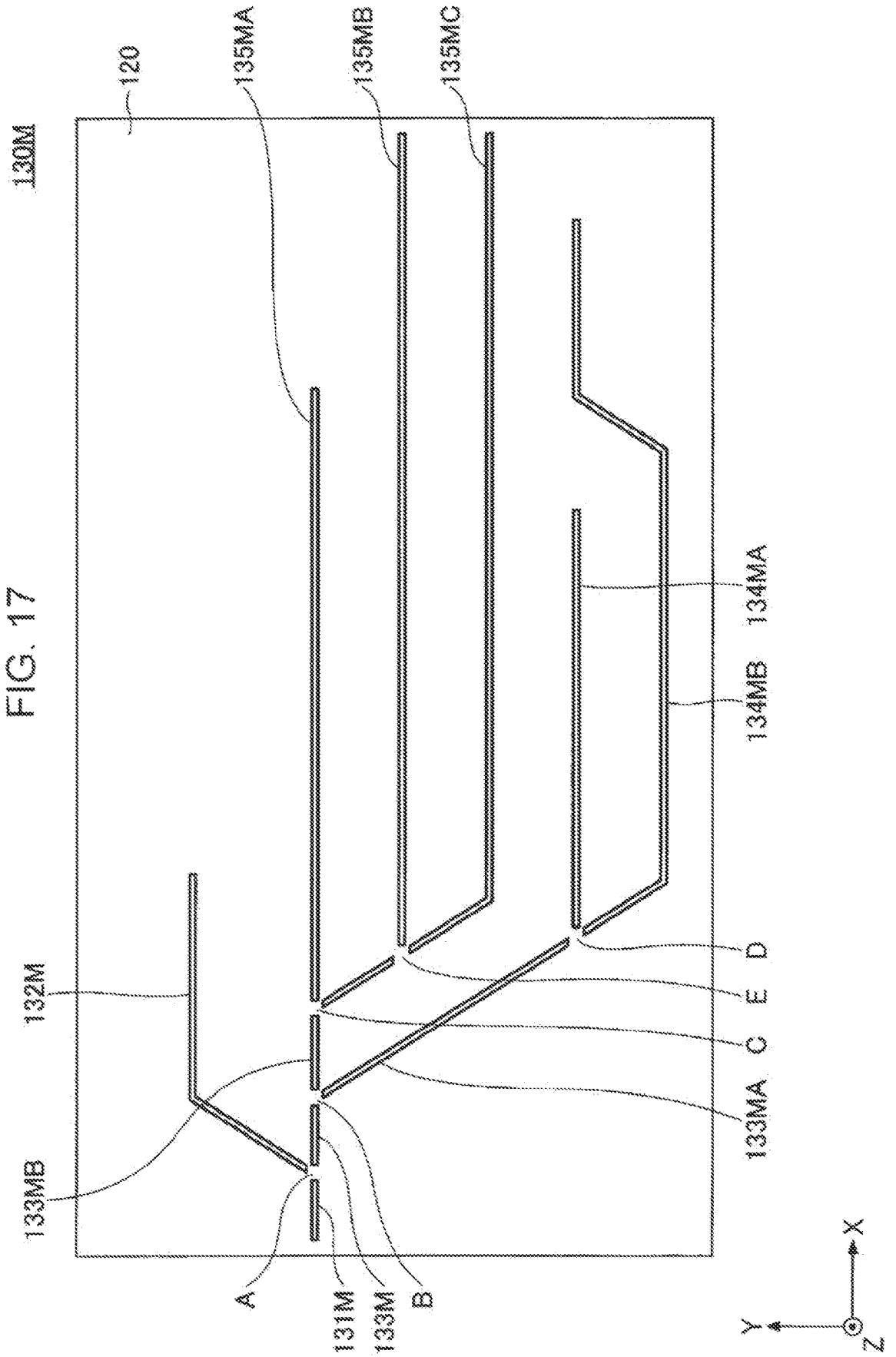
FIG. 17 illustrates patterns of a capacitance detection electrode.

The capacitance detection electrode 130M in FIG. 17, in which its patterns are illustrated, has pattern electrodes 131M, 132M, 133MA, 133MB, 134MA, 134MB, 135MA, 135MB, and 135MC. The points A to E in FIG. 17 correspond to the points A to E in FIG. 2.

The capacitance detection electrode 130M has patterns like those obtained by segmenting the tree-like pattern 160 in FIG. 2 at the points A to E. The pattern electrodes 131M to 135MC having these patterns may be placed in the vicinity of the tree-like pattern 160 so as to be along the tree-like pattern 160, without being placed immediately below the tree-like pattern 160. Therefore, the pattern electrodes 131M to 135MC do not need to be transparent. As an example, they can be formed from copper wires.

Figure 18:
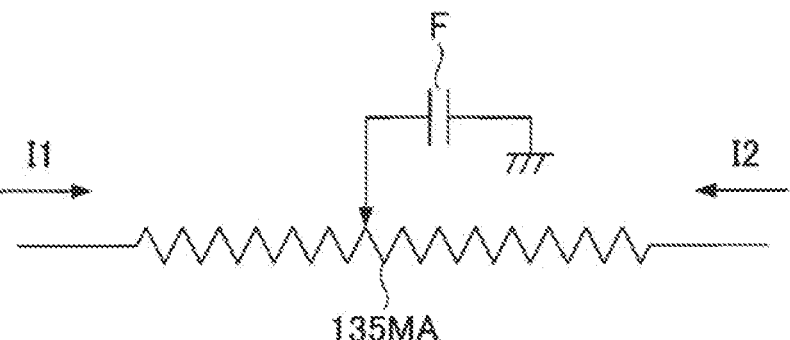
FIG. 18 illustrates the principle of position detection by the capacitance detection electrode.

FIG. 18 illustrates the principle of position detection by the capacitance detection electrode 130M. In FIG. 18, the pattern electrode 135MA is indicated as a resistor in a state in which a capacitor equivalent to the finger F is in contact with the pattern electrode 135MA, as an example. When the finger F touches the pattern electrode 135MA, currents I1 and I2 flow from both ends of the pattern electrode 135MA toward the finger F. The ratio between the values of the currents I1 and I2 changes depending on the position of the finger F between both ends of the pattern electrode 135MA. This is due to the change in the ratio between a resistance from one end of the pattern electrode 135MA to the position of the finger F and a resistance from the other end of the pattern electrode 135MA to the position of the finger F.

This type of capacitance detection electrode 130M is more inexpensive than the electrode seat 130 formed from an ITO material, so the cost of the input device 100 can be reduced. The capacitance detection electrode 130M is also smaller in size than the electrode seat 130 in plan view, so the input device 100 can be downsized.

This completes the description of the input device in an exemplary embodiment in the present invention. However, the present invention is not limited to specifically disclosed embodiments, but can be varied and modified in various ways without departing from the scope of the claims.

This international application claims priority based on Japanese Patent Application No. 2020-150706 filed on Sep. 8, 2020, and the entire contents of the application are incorporated in this international application by reference in it.

What is claimed is:

1. An input device comprising:
a panel having a front surface;
a manipulation area provided on the front surface so as to be continuous in hierarchical form;
a capacitance detection electrode provided in the manipulation area;
a plurality of icon display portions provided in the manipulation area, each icon display portion representing one of a plurality of functions; and
a tactile response generation portion provided in the manipulation area so as to be along the plurality of icon display portions,
wherein the tactile response generation portion is configured with an uneven structure.

2. The input device according to claim 1, wherein the tactile response generation portion is:
a convex portion protruding from a portion other than the tactile response generation portion;
a concave portion recessed from the portion other than the tactile response generation portion; or
a concave and convex portion formed so as to protrude and to be recessed from the portion other than the tactile response generation portion.

3. The input device according to claim 1, wherein the manipulation area has a high-end manipulation area and one or a plurality of low-end manipulation areas at lower hierarchical levels than a hierarchical level of the high-end manipulation area, and
the one or the plurality of low-end manipulation areas are placed so as to be contiguous to the high-end manipulation area.

4. The input device according to claim 3, wherein the high-end manipulation area and the plurality of low-end manipulation areas are placed as a tree diagram in a plan view.

5. The input device according to claim 3, further comprising:
a first translucent portion provided on the tactile response generation portion, the first translucent portion transmitting light from the same side as a rear surface of the panel toward the same side as the front surface;
a plurality of first light sources provided on the same side as the rear surface of the panel, the plurality of first light sources emitting light to the first translucent portion; and
a lighting controller is configured to control lighting of the plurality of first light sources, wherein
the lighting controller is further configured to:
turn on, when a manipulation is performed in the high-end manipulation area, one or more of the plurality of first light sources in correspondence to the high-end manipulation area and the plurality of low-end manipulation areas and
turn on, when a manipulation is performed in any one or more of the plurality of low-end manipulation areas, one or more of the plurality of first light sources in correspondence to the any one or more of the plurality of low-end manipulation areas in which the manipulation is performed.

6. The input device according to claim 5, wherein, when the manipulation is performed in the any one or more of the plurality of low-end manipulation areas, the lighting controller is configured to:
turn on the one or more of the plurality of first light sources in correspondence to the any one or more of the plurality of low-end manipulation areas in which the manipulation is performed and
also turn on one or more of the plurality of first light sources in correspondence to the high-end manipulation area.

7. The input device according to claim 5, wherein at least one set of the first translucent portion and one of the plurality of first light sources is placed along each of the plurality of low-end manipulation areas,
when a manipulation is performed at a high end of any one or more of the plurality of low-end manipulation areas, the lighting controller is configured to turn on one or more of the plurality of first light sources in correspondence to all icon display portions disposed in the any one or more of the plurality of low-end manipulation areas, and

the all icon display portions are part of the plurality of icon display portions.

8. The input device according to claim 5, wherein a plurality of first translucent portions and the plurality of first light sources are placed along the plurality of low-end manipulation areas;

when a manipulation is performed at a point toward a low end of one of the plurality of low-end manipulation areas, the lighting controller is configured to turn off all first light sources disposed on a high-end side with respect to the point, and the all first light sources are part of the plurality of first light sources.

9. The input device according to claim 3, further comprising:

a plurality of second translucent portions, each of which is provided to one of the plurality of icon display portions to represent a function of one of a plurality of icons, each of the plurality of second translucent portions transmitting light from the same side as a rear surface of the panel toward the same side as the front surface;

a plurality of second light sources provided on the same side as the rear surface of the panel, each of the plurality of second light sources emitting the light to one of the plurality of second translucent portion; and a lighting controller is configured to control lighting of the plurality of second light sources, wherein the lighting controller is further configured to:

turn on, when a manipulation is performed in the high-end manipulation area, one or more of the plurality of second light sources in correspondence to the high-end manipulation area and the plurality of low-end manipulation areas; and turn on, when a manipulation is performed in any one or more of the plurality of low-end manipulation areas, one or more of the plurality of second light sources in correspondence to the any one or more of the plurality of low-end manipulation areas in which the manipulation is performed.

10. The input device according to claim 9, wherein, when the manipulation is performed in the any one or more of the plurality of low-end manipulation areas, the lighting controller is configured to:

turn on the one or more of the plurality of second light sources in correspondence to the any one or more of the plurality of low-end manipulation areas in which the manipulation is performed; and also turn on one or more of the plurality of second light sources in correspondence to the high-end manipulation area.

11. The input device according to claim 9, wherein at least one of the plurality of icon display portions is placed in each of the plurality of low-end manipulation areas, when a manipulation is performed at a high end of any one or more of the plurality of low-end manipulation areas, the lighting controller is configured to turn on one or more of the plurality of second light sources in correspondence to all icon display portions disposed in the any one or more of the plurality of low-end manipulation areas, and the all icon display portions are part of the plurality of icon display portions.

12. The input device according to claim 9, wherein more than one of the plurality of icon display portions and more than one of the plurality of second light sources are placed for each of the plurality of low-end manipulation areas, when a manipulation is performed at a point toward a low end of one of the plurality of low-end manipulation areas, the lighting controller is configured to turn off one or more of second light sources in correspondence to the icon display portions on a high-end side with respect to the point, and the one or more of second light sources are part of the plurality of second light sources.

13. The input device according to claim 3, wherein the capacitance detection electrode is divided in correspondence with the high-end manipulation area and the plurality of low-end manipulation areas.

14. The input device according to claim 3, wherein the high-end manipulation area and the plurality of low-end manipulation areas are placed in a front-back direction of a vehicle.

15. The input device according to claim 3, wherein the high-end manipulation area and the plurality of low-end manipulation areas are placed in an up-down direction of a vehicle.

16. The input device according to claim 3, wherein more than one icon display portions disposed in one of the plurality of low-end manipulation areas are involved in a common function, and the more than one icon display portions are part of the plurality of icon display portions.

17. The input device according to claim 3, further comprising:

a manipulation detector configured to detect a manipulation performed in the manipulation area according to a result of detection by the capacitance detection electrode, wherein, when manipulations are concurrently performed in two or more of the plurality of low-end manipulation areas, the manipulation detector ignores a detection result about the manipulations.

18. The input device according to claim 1, further comprising:

a manipulation detector configured to detect a manipulation performed in the manipulation area according to a result of detection by the capacitance detection electrode, wherein the manipulation is configured to detect the manipulation performed in the manipulation area only during autonomous driving of a vehicle.

19. The input device according to claim 1, wherein the panel is a door panel of a door of a vehicle, and the door panel is on an interior side of the vehicle.

20. An input device comprising:

a panel having a front surface;

a manipulation area provided on the front surface so as to be continuous in hierarchical form;

a capacitance detection electrode provided in the manipulation area;

a plurality of icon display portions provided in the manipulation area, each icon display portion representing one of a plurality of functions; and a tactile response generation portion provided in the manipulation area so as to be along the plurality of icon display portions, wherein the manipulation area has a high-end manipulation area and one or a plurality of low-end manipulation areas at lower hierarchical levels than a hierarchical level of the high-end manipulation area, and the one or the plurality of low-end manipulation areas are placed so as to be contiguous to the high-end manipulation area.

* * * * *